United States Patent
Gage et al.

(10) Patent No.: US 10,511,525 B2
(45) Date of Patent: Dec. 17, 2019

(54) CONVEYING DEVICE-DEPENDENT CONTEXT IN A NETWORK ADDRESS

(71) Applicants: William Anthony Gage, Stittsville (CA); Aaron Callard, Ottawa (CA)

(72) Inventors: William Anthony Gage, Stittsville (CA); Aaron Callard, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 135 days.

(21) Appl. No.: 14/943,647

(22) Filed: Nov. 17, 2015

(65) Prior Publication Data

US 2016/0142308 A1    May 19, 2016

Related U.S. Application Data

(60) Provisional application No. 62/081,383, filed on Nov. 18, 2014.

(51) Int. Cl.
*H04L 12/741* (2013.01)
*H04L 29/06* (2006.01)
(Continued)

(52) U.S. Cl.
CPC .............. *H04L 45/74* (2013.01); *H04L 47/18* (2013.01); *H04L 47/2483* (2013.01);
(Continued)

(58) Field of Classification Search
CPC ..... H04L 45/74; H04L 47/18; H04L 47/2483; H04L 61/2007; H04L 61/2092; H04L 61/6004; H04L 61/6022; H04L 61/6059
See application file for complete search history.

(56) References Cited

U.S. PATENT DOCUMENTS 7,058,728 B1 * 6/2006 Eklund ................. H04L 29/06
370/474
8,725,160 B2    5/2014 Qiang
(Continued)

FOREIGN PATENT DOCUMENTS

CN    101047614 A    10/2007
CN    103686672 A    3/2014
(Continued)

OTHER PUBLICATIONS

International Patent Application No. PCT/CN2015/094806, International Search Report and Written Opinion dated Feb. 17, 2016.
(Continued)

*Primary Examiner* — Luat Phung

(57) ABSTRACT

A method for conveying context information that governs packets flowing in at least a first direction between at least one wireless device and a corresponding node communicating with the device comprises an embedder node populating a context portion, of a header of a packet for flow in a second reverse direction, that, once populated with context information that governs packet flow in the first direction, is imparted in the packet flow along the network in either the first or second direction and is conveyed in both directions, an unpacker node retrieving the context information from the context portion of a packet flowing in the first direction, and a configurer node applying the retrieved information to govern packet flow in the first direction therefrom. The embedder, unpacker and/or configurer nodes can be the same.

22 Claims, 13 Drawing Sheets

(51) Int. Cl.
  *H04L 29/12* (2006.01)
  *H04W 4/00* (2018.01)
  *H04W 72/04* (2009.01)
  *H04W 4/70* (2018.01)
  *H04L 12/801* (2013.01)
  *H04L 12/851* (2013.01)
  *H04W 76/10* (2018.01)

(52) U.S. Cl.
  CPC ............ *H04W 4/70* (2018.02); *H04W 76/10* (2018.02); *H04L 61/2007* (2013.01); *H04L 61/2092* (2013.01); *H04L 61/6004* (2013.01); *H04L 61/6022* (2013.01); *H04L 61/6059* (2013.01)

(56) References Cited

U.S. PATENT DOCUMENTS

| | | |
|---|---|---|
| 2002/0101859 A1 | 8/2002 | Maclean |
| 2007/0086486 A1 | 4/2007 | Park et al. |
| 2009/0103541 A1 | 4/2009 | Lin |
| 2012/0113966 A1 | 5/2012 | Tao |
| 2013/0067012 A1* | 3/2013 | Matzkel .............. H04L 63/0428 709/206 |
| 2014/0003357 A1 | 1/2014 | Ejzak et al. |
| 2014/0044030 A1* | 2/2014 | Ramachandran ........................... H04W 52/0235 370/311 |
| 2014/0086143 A1 | 3/2014 | Foti et al. |
| 2014/0140279 A1 | 5/2014 | Barrett |
| 2014/0206333 A1 | 7/2014 | Qiang |
| 2015/0111591 A1* | 4/2015 | Hoffberg ............ G06Q 10/0631 455/452.1 |

FOREIGN PATENT DOCUMENTS

| | | |
|---|---|---|
| CN | 103733658 A | 4/2014 |
| WO | WO2013169073 A1 | 11/2013 |
| WO | 2014036890 A1 | 3/2014 |

OTHER PUBLICATIONS

International Patent Application No. PCT/CN2015/094931, International Search Report and Written Opinion dated Feb. 18, 2016.
English Abstract of CN101047614.
English Abstract of CN103686672.
English Abstract of CN103733658 (corresponding to US2014140279).
3GPP TS 23.769, "Machine-Type Communications; Group based Enhancements", <http://www.3gpp.org/ftp/Specs/html-info/23769.htm>.
3GPP TS 23.888, "System improvements for Machine-Type Communications (MTC)", <http://www.3gpp.org/ftp/Specs/html-info/23888.htm>.
3GPP TS 29.281, "General Packet Radio System (GPRS) Tunnelling Protocol User Plane (GTPv1-U)", <http://www.3gpp.org/ftp/Specs/html-info/29281.htm>.
3GPP TS 36.211, "Evolved Universal Terrestrial Radio Access Network (E-UTRAN); Physical Channels and Modulation", <http://www.3gpp.org/ftp/specs/html-info/36211.htm>.
3GPP TS 36.321, "Evolved Universal Terrestrial Radio Access Network (E-UTRAN); Medium Access Control (MAC) protocol specification", http://www.3gpp.org/ftp/Specs/html-info/36321.htm.
3GPP TS 36.331, "Evolved Universal Terrestrial Radio Access Network (E-UTRAN); Radio Resource Control (RRC) protocol specification", <http://www.3gpp.org/ftp/Specs/html-info-36331.htm>.
IETF RFC 2460, "Internet Protocol, Version 6 (IPv6) Specification", Dec. 1998, http://tools.ietf.org/html/rfc2460.
IETF RFC 3954, "NetFlow Services Export", Oct. 2004, http://tools.ietf.org/html/rfc3954.
IETF RFC 5213, Proxy Mobile IPv6, Aug. 2008, http://tools.ietf.org/html/rfc5213.
IETF RFC 5740, "NACK-Oriented Reliable Multicast (NORM) Transport Protocol", Nov. 2009, <http://tools.ietf.org/html/rfc5740>.
IETF RFC 7252, "The Constrained Application Protocol (CoAP)", Jun. 2014, http://tools.ietf.org/html/rfc7252.
Mobile IP (MIP) disclosed in IETF RFC 6275, "Mobility Support in IPv6", Jul. 2011, <http://tools.ietf.org/html/rfc6275>.
RFC 2663 "IP Network Address Translator (NAT) Terminology and Considerations", Aug. 2009, https://tools.ietf.org/html/rfc2663.
RFC 4291, "IP Version 6 Addressing Architecture", Feb. 2006 http://tools.ietf.org/html/rfc4291.
Extended European Search Report dated Jan. 16, 2018 for corresponding European Application No. 15861058.4 filed Nov. 18, 2015.

* cited by examiner

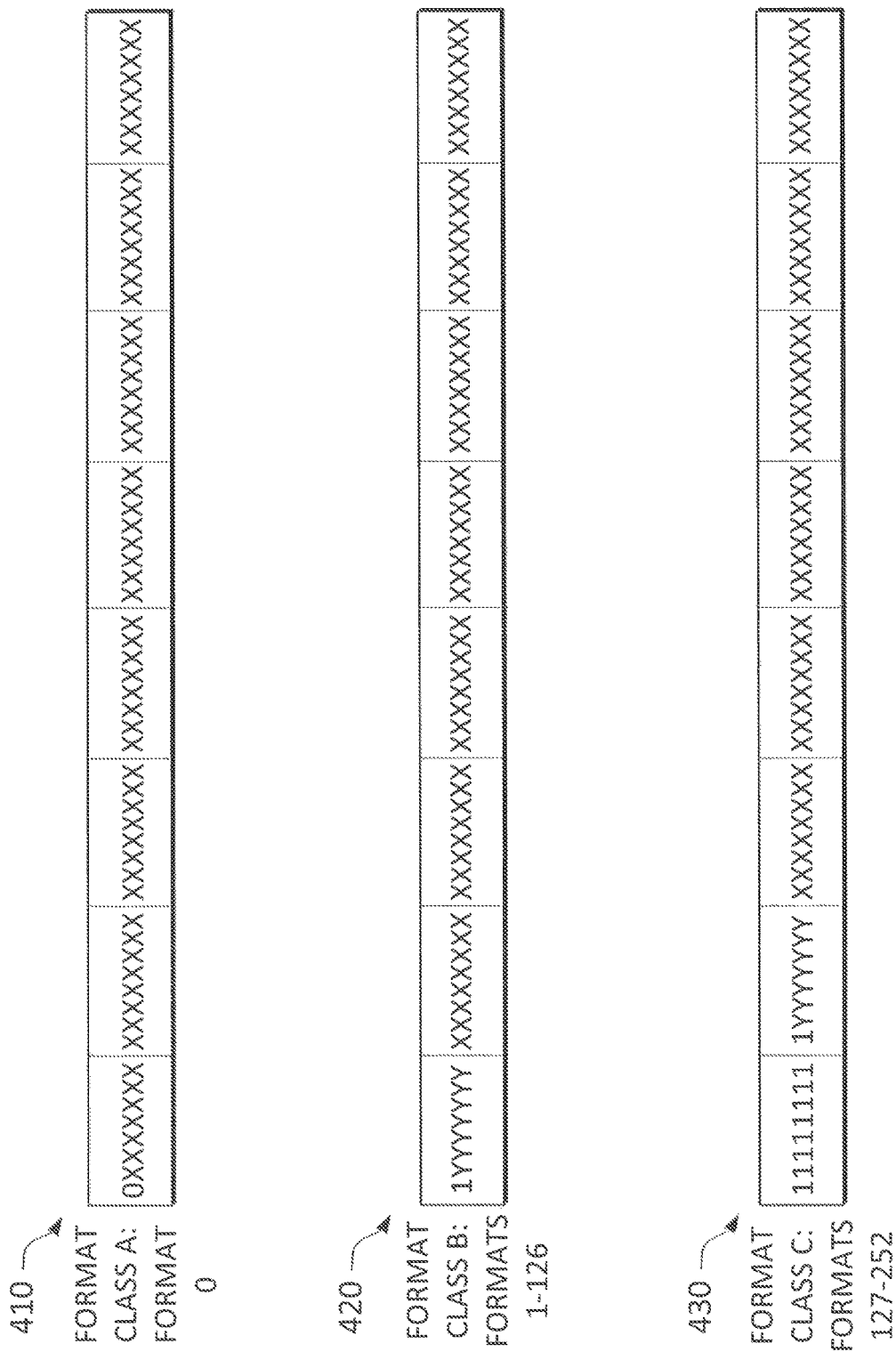

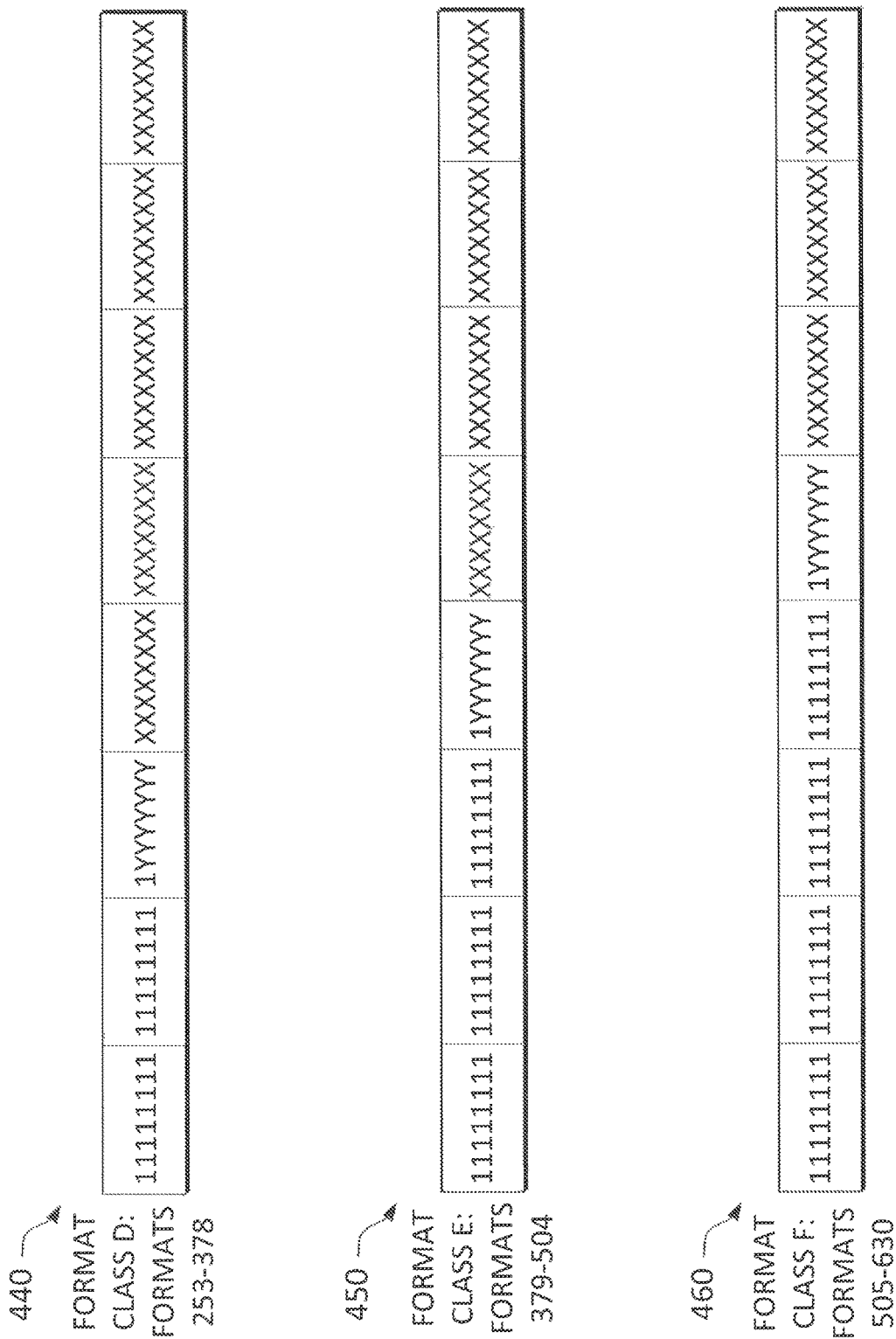

CONVEYING DEVICE-DEPENDENT CONTEXT IN A NETWORK ADDRESS

RELATED APPLICATIONS

The present disclosure claims the benefit of and priority to U.S. Provisional Patent Application Ser. No. 62/081,383, entitled "System and Method for Flow-Based Addressing in a Mobile Environment" filed 18 Nov. 2014 by GAGE, William Anthony, which is incorporated by reference in its entirety herein.

TECHNICAL FIELD

The present disclosure relates to packet-based communications and in particular to wireless communications involving wireless Machine-Type Communication (MTC) devices in a network using the Internet Protocol (IP).

BACKGROUND

Machine-to-Machine (M2M) communications (in some cases referred to as Machine-Type Communications MTC) is a designation to describe communications and technologies that permit both wireless and wired communications devices (MTC device) to communicate directly or across a network (such as an Internet Protocol (IP) network) with other devices or with applications running on remote servers.

Those having ordinary skill in the relevant art will appreciate that for the most part, the acronyms "M2M" and "MTC" may be used interchangeably. Nevertheless, applications relating to such communications and technologies are typically referred to as "M2M applications", while traffic is typically referred to as "MTC traffic". Devices may typically be referred to as "M2M devices" or "MTC devices". Additionally, certain standards bodies may tend to refer to one term in preference to the other.

MTC may be differentiated from Human-Type Communications (HTC) such as voice and data communications using smartphones, laptops or tablets, in that MTC traffic may be generally characterized as being sporadic and low bandwidth, while HTC traffic may be characterized as involving a substantially incessant demand for high bandwidth. Thus, as noted in 3GPP TS 23.888, "System improvements for Machine-Type Communications (MTC)", <http://www.3gpp.org/ftp/Specs/html-info/23888.htm> and IETF RFC 7252, "The Constrained Application Protocol (CoAP)", June 2014, <http://tools.ietf.org/html/rfc7252>, MTC traffic may typically involve the exchange of a few small packets in very short-lived (relative to HTC communications) packet flows.

The term "packet flow" may, in some example embodiments, refer to "a unidirectional sequence of packets with some common properties that pass through a network device", as defined in IETF RFC 3954, "NetFlow Services Export", October 2004, <http://tools.ietf.org/html/rfc3954>.

In some cases the packet flow may consist of a single packet, typically in the uplink (UL) direction (from the MTC device to a remote corresponding node (RCN) recipient). Further, the period between packet bursts (relative to HTC communications) may be quite long, ranging from minutes to hours.

Moreover, MTC communications systems may be differentiated from HTC systems in that it is anticipated, and taken into account in network design, that there will be a very large number of MTC devices (relative to HTC devices) within a network coverage area.

In general, the term "wireless device" may encompass both MTC devices and HTC devices, and other untethered communications devices, including without limitation, User Equipment (UE), Fixed Stations (FS) and Mobile Stations (MS).

As a non-limiting example, an MTC device such as a sensor or meter may be configured to capture an event, such as a temperature, a sensor reading or an inventory level, and relay it (in the UL direction) through a network to an M2M Application somewhere in the Internet-at-large, that compiles (for example in conjunction with one or more events captured by the same, or one or more additional, MTC device(s), or one or more other data sources) information and analyzes such information to perform one or more actions. In some cases, such action may include providing one or more requests to the MTC device (in the downlink (DL) direction).

A schematic view of an example configuration of certain functional elements of a MTC wireless network is described in FIG. 1 as may be used, for example, in a Third Generation Partnership Project (3GPP) network. The network, shown generally at 100, comprises at least one Remote Corresponding Node, such as an Application Server (AS) 110, at least one Border Gateway (BG) 115, at least one MTC Inter-Working Function (MTC-IWF) 120, at least one Radio Access Network (RAN) 130 and at least one MTC device 140 and the Internet-at-large, shown as 150.

The RCN 110 is coupled through the Internet-at-large 150 to the BG 115 and comprises at least one M2M Application 111. The M2M Application 111 may comprise application-specific logic for managing, configuring, controlling and communicating with one or more of the MTC devices 140. In general, the term "Remote Corresponding Node" encompasses application servers (AS), wired and wireless end node devices, and other network nodes communicatively coupled to the RAN 130.

The Internet-at-large 150 couples the RCN 110 to the RAN 130 and MTC-IWF 120 through the BG 115.

The BG 115 couples the MTC-IWF 120 and the RAN 130 to the Internet-at-large 150. The BG 115 manages communication through the Internet-at-large 150 to the RCN 110.

The MTC-IWF 120 is coupled to the RCN 110 through the BG 115 and the Internet-at-large 150 and to the RAN 130.

The RAN 130 is coupled to the MTC-IWF 120 and BG 115 and is coupled to at least one MTC device 140. The RAN 130 may comprise at least one access point (AP) 131. The AP 131 manages communications over a radio link 160 to the MTC device 140. In general, the term "Access Point" encompasses Base Stations (BS), base station controllers, radio network controllers, Node-Bs, evolved Node-Bs (eNBs) and other radio access controllers. It may also encompass network nodes such as access routers that may be responsible for packet flow management.

The MTC device 140 is wirelessly coupled to at least one of the APs 131 comprising the RAN 130. The MTC device 140 may comprise one or more MTC client applications that communicates with a corresponding M2M application 111. The MTC device 140 may be a stand-alone device or may comprise an element of a wireless device (WD).

M2M communications are typically dominated by UL (away from the MTC device 140) traffic sent by the MTC client application to the corresponding M2M application 111 to report an event. Occasionally, the M2M application will transmit a DL (toward the MTC device 140) packet to the MTC device 140, for example to update a configuration of the MTC device 140, or to request a report of information to the M2M application 111.

As such, given the relatively low frequency of UL communications and even lower frequency of DL communications, the MTC device 140 may be configured to enter a low-power battery state and avoid all communications with the M2M Application 111 along the wireless network or RAN 130 in order to conserve battery power. This does not typically pose any issue with regard to UL communication of events, since such events generally originate with the MTC device 140, and the MTC device 140 can resume a higher-power battery and operational state before generating (and in some cases capturing) the event and communicating it in an UL packet to the M2M Application 111.

However, DL communications may occur infrequently and without warning. To this end, a number of mechanisms have been developed to permit the MTC device 140 to re-enter a higher-power battery state sufficient to receive DL communications from the M2M Application 111.

For example, the MTC device 140 may be alerted to the arrival of a DL packet from time to time by the RAN 130, including through a paging mechanism. In such a case, as described in 3GPP TS 36.331, "Evolved Universal Terrestrial Radio Access Network (E-UTRAN); Radio Resource Control (RRC) protocol specification", <http://www.3gpp.org/ftp/Specs/html-info-36331.htm>, the MTC device 140 is configured to listen for an alert during pre-defined paging opportunities (which may include one or more specific points in time and/or one or more specific sets of radio resources). When the MTC device 140 detects a page during one of such paging opportunities, it obtains radio resources to receive one or more DL packet(s) from the M2M Application 111, which may have been previously buffered by the RAN 130 for DL transmission to the MTC device 140. If no page is detected during a paging opportunity, the MTC device 140 may return to a low battery state until the next scheduled paging opportunity.

In another example, as described in 3GPP TS 36.331, "Evolved Universal Terrestrial Radio Access Network (E-UTRAN); Radio Resource Control (RRC) protocol specification", <http://www.3gpp.org/ftp/Specs/html-info-36331.htm>, a semi-persistent schedule may be employed in which the MTC device 140 is scheduled to listen for DL transmissions on specific radio resources at specific times. In such example, the RAN 130 can transmit DL packets to the MTC device 140 without any initial alerting or paging sequence.

Unicast packet forwarding in the Internet is designed to deliver a packet from a source node to a fixed point in the network where the destination node is (currently) attached. The network IP address used as a destination address in a packet header identifies this point of attachment. Thus, as with wireless devices in general, in order to identify an MTC device 140 and allow it to be differentiated from other wireless devices, the device is assigned a semi-static IP address. In today's mobile wireless environment, an IP address is normally assigned to (an interface on) a wireless device when the wireless device registers with the network. Currently, the IP address may be assigned using one of at least four mechanisms.

The first mechanism involves (typically manual) configuration of an IP address into each wireless device during the manufacturing process. In so doing, the deployment of such device may be constrained to a geographical (or otherwise) area where its assigned IP address maps onto a corresponding subnet. As a result, higher inventory costs may be incurred due to stockpiling of replacements on a per-subnet basis rather than for a general population of wireless devices.

The second mechanism involves manual pre-provisioning of an IP address into each wireless device before deployment. Such mechanism increases the labour and associated costs of deployment of the device. Furthermore, considerable effort is expended in managing the pool of available IP addresses. Nevertheless, despite such efforts, deployed devices may sometimes be replaced without invoking proper address recycling procedures. As a result, over time, otherwise valid IP address may be "lost".

The third mechanism involves use of a protocol such as the Dynamic Host Configuration Protocol (DHCP) to dynamically assign an IP address to the wireless device. DHCP involves both a client in the wireless device as well as network infrastructure to support the protocol. These demands increase the cost and complexity of both the wireless device and the supporting network architecture.

The fourth mechanism involves use of a method such as (IPv6) StateLess Address Auto-Configuration (SLAAC) to dynamically assign an IP address to the wireless device. As with DHCP, SLAAC involves both a client in the wireless device as well as network infrastructure, which increases the cost and complexity of both the wireless device and the supporting network architecture. Further, SLAAC calls for the periodic broadcast of router advertisement messages by the network to announce the available subnet prefix, which consumes radio link bandwidth and resources.

Thus, depending upon the mechanism employed, the assignment of an IP address to an MTC device 140 may either increase the complexity and cost of the MTC device 140, or may incur significant deployment costs with each MTC device 140 as well as increase overhead costs. Given the current and rapidly increasing number of MTC devices 140, such complexity and costs can become very large, to the extent that it may begin to impact the cost-effectiveness of employing MTC technology.

Moreover, it is expected that as MTC devices 140 become more pervasive, network topologies may increasingly be characterized by heterogenous networks (HetNets) having a large number of small cells serving a dense population of mobile, mostly MTC devices 140. Typically, a wireless device retains its assigned IP address for as long as it is active within the RAN 130. In contrast to operations in the Internet-at-large, the assigned IP address identifies a Mobility Anchor (MA) point (not shown) rather than where the wireless device is (currently) attached to the RAN 130. However, whenever a wireless device changes its point of attachment at the radio edge, control plane signalling packets are exchanged between a serving AP 131 and the MA (not shown) for the wireless device. Thus, it is expected that control signalling overheads will begin to escalate.

As discussed above, typically, an MTC device 140 may enter a low-power state and avoid all communications with the RAN 130 between UL packet bursts of event information. It is conceivable that a mobile MTC device 140 could change its point of attachment while in a low-power state. If so, the RAN 130 would be expected to redirect DL traffic to the new point of attachment. Currently, there are at least two approaches that could be appropriated to do so.

First, tunnelling solutions, including General Packet Radio System (GPRS) Tunnelling Protocol (GTP) disclosed in 3GPP TS 29.281, "General Packet Radio System (GPRS) Tunnelling Protocol User Plane (GTPv1-U)", <http://www.3gpp.org/ftp/Specs/html-info/29281.htm>, Mobile IP (MIP) disclosed in IETF RFC 6275, "Mobility Support in IPv6", July 2011, <http://tools.ietf.org/html/rfc6275>, and their derivatives, may be employed to provide encapsulation of a client packet inside a tunnel packet by the MA for flows addressed to a particular device or device interface. The destination address in the tunnel packet identifies the point of attachment, such as an AP 131, and the destination address in the original (encapsulated) packet identifies the actual destination wireless device. This increases the size of each packet, leading to a concomitant increase in bandwidth demand. In some cases, in which backhaul links, such as wireless backhaul and mesh links, are bandwidth-constrained, such increase in demand may be particularly acute. Moreover, the increased size of the packets because of the encapsulating tunnel packets, may lead to an increased frequency of fragmentation and reassembly of the oversized packet, resulting in even greater bandwidth and processing overheads. Some variants support forwarding for individual flows but these incur a commensurate increase in the number of "care-of" addresses that are allocated, and in the amount of context information that is maintained by the ingress routers.

Second, a new IP address may be assigned when the mobile MTC device 140 changes its point of attachment. This may incur considerable signalling overhead when using, by way of non-limiting example, DHCP or SLAAC. Given that many MTC devices 140 are portable and rely on battery power, such overhead can have an impact on battery life and thus on the operational life of the MTC device 140.

Furthermore, every wireless device has an associated RAN context. Such context is typically comprised of information related to resources assigned to the device by the RAN 130. Such information may include any or all of UL and/or DL transmission schedules, Quality of Service (QoS) requirements and transmission parameters.

The issue becomes more acute having regard to the sporadic nature of typical MTC device 140 communications. While the MTC device 140 is in a low-power state between UL packet bursts, the RAN 130 decides between two options.

The first option is for the RAN 130 to maintain the context information for the MTC device 140. While this minimizes processing, both in the RAN 130 and the MTC device 140 itself, when the MTC device 140 resumes communications, the maintained context information will occupy storage in the RAN 130. Thus, the resources that will be allocated in the RAN 130 for storage and maintenance of such context information may grow very large when the expected massive number of MTC devices 140 is deployed for service by the RAN 130.

The second option is to discard the context information for the MTC device 140 when it enters the low-power state and to generate new context information when the MTC device 140 resumes communications. While alleviating demands on RAN 130 storage, this option increases the communications and processing load on the RAN 130 and on the MTC device 140. Again, given that many MTC devices 140 are portable and rely on battery power, such load can have an impact on battery life and thus on the useful operational life of the MTC device 140. Moreover, the increased communications and processing load may incur delays in resuming communications between the M2M application 111 and the MTC device 140.

Therefore there exists a need to reduce the overheads associated with maintaining context for large numbers of MTC devices and for forwarding packets to MTC devices in a mobile environment while, at the same time, reducing the amount of battery power consumed in an MTC device, reducing the amount of signalling between an MTC device and a RAN and any combination of any of these.

BRIEF DESCRIPTION OF THE DRAWINGS

Example embodiments of the present disclosure will now be described by reference to the following figures, in which identical reference numerals in different figures indicate identical elements and in which:

FIG. 4 shows various example format classes, of embedded context portions of varying bit-length in the IPv6 address of FIG. 2C, according to example embodiments of the present disclosure;

Figure 1:
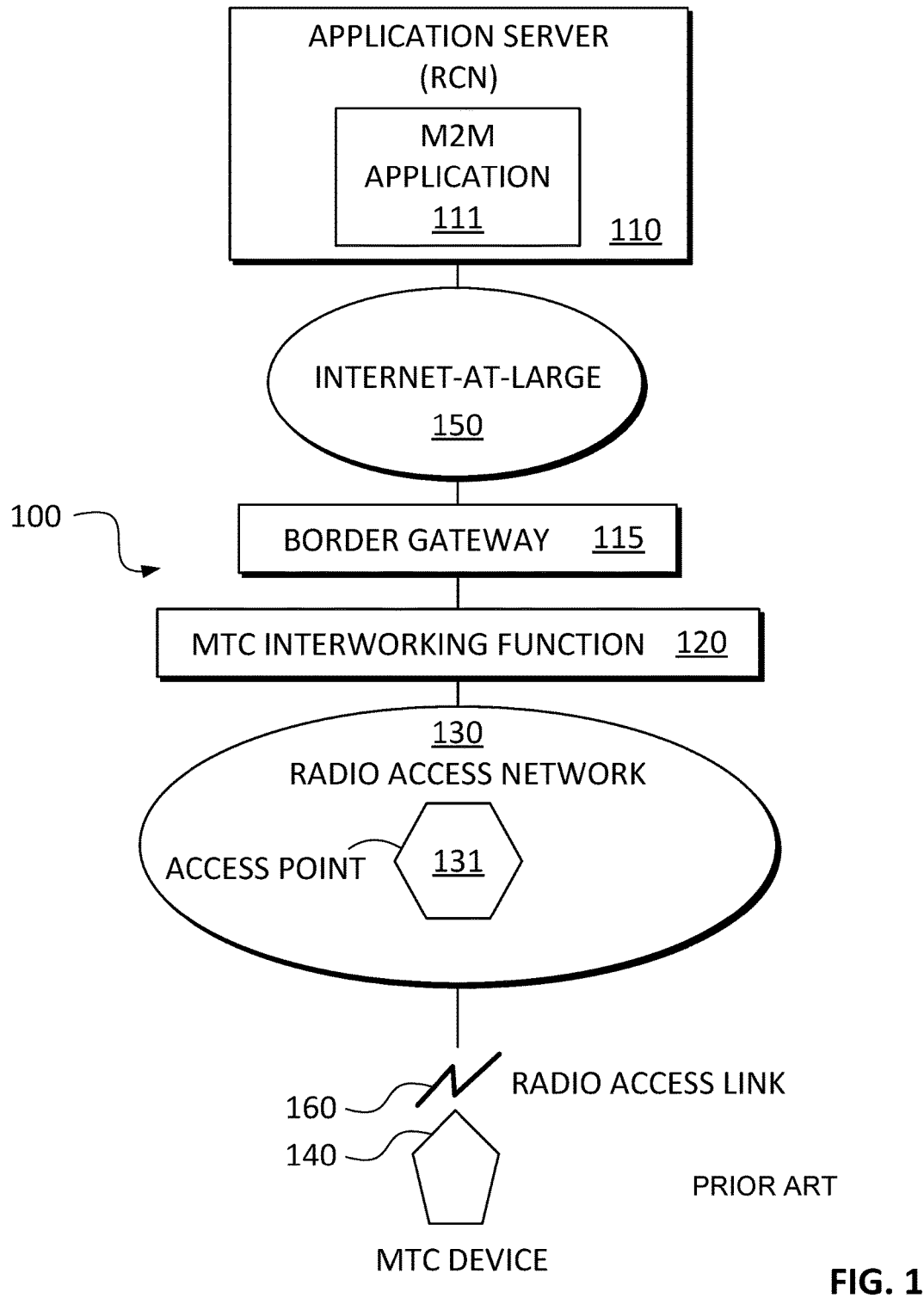
FIG. 1 is a schematic view of an example configuration of certain functional elements of a MTC wireless network.

In the present disclosure, for purposes of explanation and not limitation, specific details are set forth in order to provide a thorough understanding of the present disclosure. In some instances, detailed descriptions of well-known devices, circuits and methods are omitted so as not to obscure the description of the present disclosure with unnecessary detail.

Accordingly, the system and method components have been represented where appropriate by conventional symbols in the drawings, showing only those specific details that are pertinent to understanding the embodiments of the present disclosure, so as not to obscure the disclosure with details that will be readily apparent to those of ordinary skill in the art having the benefit of the description herein.

Any feature or action shown in dashed outline may in some example embodiments be considered as optional.

SUMMARY

The present disclosure discloses a method and apparata for conveying context information that governs packets flowing in a first direction between a wireless device and a remote corresponding node (RCN) communicating with the wireless device. The method assigns a network address to a packet flow emanating from a wireless device that includes embedded context information in a context portion. The context information populates the network address identified as the packet source address in a packet header and so it is conveyed during the packet flow through the network to the RCN. The embedded context information can thus be automatically transferred by the RCN to a responding or corresponding packet from the RCN to the wireless device when the source address of the received packet(s) is copied into responding packet(s) as the destination address. As such, the context information is imparted in the packet flow in both directions. In some example embodiments, the packet is an Internet Protocol (IP) packet.

Thus, a first access point (AP) handling packets in one direction on behalf of a wireless device may specify and convey, via the RCN, a desired context to be employed for use in a future packet flow to a second AP handling packets in the reverse direction on behalf of the wireless device. In some example embodiments, the first AP and the second AP may be the same network element.

In one example embodiment of the present disclosure, there is provided a method for conveying context information that governs packets flowing in at least a first direction (e.g. a downlink direction) between at least one wireless device and a corresponding node communicating with the device. The method comprises populating a context portion, of a header of a packet for flow in a second reverse direction (e.g. an uplink direction), that, once populated with context information that governs packet flow in the first direction, is imparted in the packet flow along the network in either the first or second direction and is conveyed in both directions. The method also comprises retrieving the context information from the context portion of a packet flowing in the first direction. The method also comprises applying the retrieved information to govern packet flow in the first direction therefrom.

The context portion can be in a network address in a packet header. The action of populating can comprise populating the context portion in a source address in a packet header, or into a predefined context portion format. The action of retrieving can comprise retrieving context information from the context portion in a destination address in a packet header. The packets can be IPv6 packets. The context portion can replace an interface identifier in an IPv6 address. The action of populating can comprise populating a routing prefix in an IPv6 address. The context information can comprise at least one aspect selected from a group consisting of at least one network entity, a radio transmission group, an access point, an access point controller, the device, a radio access link connection comprising at least one of a time, frequency, spatial and coding resource, a radio link transmission parameter comprising at least one of a modulation scheme, a coding scheme, a transmit power level and a precoding matrix, a radio link transmission opportunity comprising a transmission resource and a schedule, a paging group, a paging opportunity comprising a paging resource and a schedule, a path, a QoS parameter comprising at least one of allowable delay, allowable packet loss and a battery consumption parameter, a network node identity, a communications protocol, a service function chain, a logical context identifier other than an inherent characteristic of the device that denotes context, and any combination of any of these. The context information may comprise a numerical value, a pointer into a table of numerical values, and any combination of these. The action of populating can comprise deriving the context information from information selected from a group consisting of an IP header field, a transport protocol header field, an application header field, a characteristic of a radio access link connection over which packets flow in the first direction, a characteristic of a radio access link connection over which packets flow in the second direction, a network node identity, a communications protocol, an indication that the device is a mobile device, an indication that the device is a non-mobile device, an indication that the device is an MTC device, an indication that the device is an HTC device, a MAC control element of a radio access link connection, an instruction received from an entity selected from a group consisting of a radio resource management entity, a traffic management entity, an interworking function, a border gateway, an application, an access point, an access point controller and any combination of any of these. The first direction can be a downlink direction towards the device. The second direction can be an uplink direction from the device. The action of populating can comprise populating the context portion in the header of a plurality of packets in the second direction with common context information. The at least one wireless device can comprise a group of devices associated with packets flowing in the first direction that are governed by common context information. The at least one wireless device can be an MTC device and/or a mobile device. The corresponding node can be an application server and can comprise an M2M application in communication with the at least one wireless device. The corresponding node can copy the context portion from a packet flowing in the second direction to the context portion of a packet flowing in the first direction. The context information can remain unchanged during packet flow along the network in the first or second direction or both. In one example embodiment of the present disclosure, there is provided, in a network through which packets flow in a first (e.g. downlink) and a second reverse (e.g. uplink) direction between at least one wireless device and a corresponding node communicating with the device, an embedder node. The embedder node through which packets flow in the second direction comprises an embedder for populating a context portion, of a header of a packet for transmission in the second direction, that, once populated with context information that governs packet flow in the first direction, is imparted in the packet flow along the network in either the first or second direction and is conveyed in both directions. The embedder node can be selected from a group consisting of an access point, a base station, a base station controller, a radio network controller, a NodeB, an evolved NodeB, a radio access controller, an access router, an access point controller, an inter-working function, a device, and any combination of any of these. A packet can be received in the second direction by the corresponding node and the context portion of the packet can be copied by the corresponding node into the context portion of a packet transmitted in the first direction. The embedder node can further comprise an unpacker for retrieving, from the context portion of the packet transmitted in the first direction, context information that governs packet flow in the first direction and/or a configurer for applying context information retrieved from the context portion of the packet transmitted in the first direction to packet flow in the first direction.

In one example embodiment of the present disclosure, there is provided, in a network through which packets flow in a first (e.g. downlink) and a second reverse (e.g. uplink) direction between at least one wireless device and a corresponding node communicating with the device, an unpacker node. The unpacker node through which packets flow in the first direction comprises an unpacker for retrieving, from a context portion of a header of a packet received in the first direction, that, once populated with context information that governs packet flow in the first direction, is imparted in the packet flow along the network in either the first or the second direction and is conveyed in both directions.

The unpacker node can also comprise a configurer for applying the retrieved context information to packet flow in the first direction and/or an embedder for populating a context portion, of a header of a packet for transmission in the second direction, with context information governing packet flow in the first direction. The unpacker node can be selected from a group consisting of an access point, a base station, a base station controller, a radio network controller, a NodeB, an evolved NodeB, a radio access controller, an access router, an access point controller, an inter-working function, and any combination of any of these.

In one example embodiment of the present disclosure, there is provided, in a network through which packets flow in a first (e.g. downlink) and a second reverse (e.g. uplink) direction between at least one wireless device and a corresponding node communicating with the device, a configurer node. The configurer node comprises a configurer for applying to packet flow in the first direction, context information retrieved from a context portion of a header of a packet received in the first direction and governing packet flow in the first direction, the context portion, once populated with the context information, being imparted in the packet flow along the network in either the first or the second direction and conveyed in both directions.

The configurer node can comprise an unpacker for retrieving the context information from the context portion or can be communicatively coupled to a node comprising an unpacker for retrieving the context information from the context portion and for providing the context information to the configurer node. The configurer node can comprise an embedder for populating a context portion, of a header of a packet for transmission in the second direction, with context information governing packet flow in the first direction. The configurer node can be selected from a group consisting of an access point, a base station, a base station controller, a radio network controller, a NodeB, an evolved NodeB, a radio access controller, an access router, an access point controller, an inter-working function, and any combination of any of these.

In one example embodiment of the present disclosure, in a network through which packets flow in a first (e.g. downlink) and a second reverse (e.g. uplink) direction between at least one wireless device and a corresponding node communicating with the device, there is provided a computer program product having a computer program stored thereon, containing computer-readable program instructions. When executed by a processing unit in an embedder node, the program instructions cause the embedder node to populate a context portion, of a header of a packet for transmission in the second direction, that, once populated with context information that governs packet flow in the first direction, is imparted in the packet flow along the network in either the first or the second direction and is conveyed in both directions.

In one example embodiment of the present disclosure, in a network through which packets flow in a first (e.g. downlink) and a second reverse (e.g. uplink) direction between at least one wireless device and a corresponding node communicating with the device, there is provided a computer program product having a computer program stored thereon, containing computer-readable program instructions. When executed by a processing unit in an unpacker node, the program instructions cause the unpacker node to retrieve, from a context portion, of a header of a packet received in the first direction that, once populated in a packet with context information that governs packet flow in the first direction, is imparted in the packet flow along the network in either the first direction or the second direction and is conveyed in both directions.

In one example embodiment of the present disclosure, in a network through which packets flow in a first (e.g. downlink) and a second reverse (e.g. uplink) direction between at least one wireless device and a corresponding node communicating with the device, there is provided a computer program product having a computer program stored thereon, containing computer-readable program instructions. When executed by a processing unit in a configurer node, the program instructions cause the configurer node to apply to packet flow in the first direction, context information retrieved from a context portion of a header of a packet received in the first direction and governing packet flow in the first direction, the context portion, once populated with the context information, being imparted in the packet flow along the network in either the first or the second direction.

In a first aspect of the present invention, there is provided a method of routing uplink packets from a user equipment (UE). The method comprises the steps of receiving an uplink packet from the UE; modifying the received packet in accordance with information associated with context information associated with the UE; and transmitting the modified packet towards a destination.

In an embodiment of the first aspect of the present invention, the step of receiving an uplink packet includes receiving the uplink packet directly from the UE. In another embodiment, the step of receiving an uplink packet includes receiving the uplink packet over an air interface. In a further embodiment, the method further includes the step of determining Radio Access Network (RAN) context information associated with the UE prior to modifying the received packet. In a further embodiment, modifying the received packet includes modifying the received packet to store information associated with the context information. In another embodiment, modifying the received packet includes storing information associated with the context information in a header of the received packet. In yet another embodiment, modifying the received packet includes storing information associated with the context information in a source address field of the received packet. In further embodiments, the source address field stores an Internet Protocol version 6 (IPv6) address associated with the UE, and the step of modifying includes storing the context information in the IPv6 address of the UE. In another embodiment, the source address field stores an Internet Protocol version 6 (IPv6) address associated with the UE, and the step of modifying includes storing an index value, determined in accordance with the context information, in the IPv6 address of the UE.

In a second aspect of the present invention, there is provided a network node for routing uplink packets from a user equipment (UE). The network node comprises a UE interface, a network interface, a memory and a processor. The UE interface is configured for receiving packets from the UE. The network interface is configured for transmitting packets to destination addresses. The memory stores instructions. The processor is operatively connected to the UE interface, the network interface and the memory. Upon execution of instructions stored in the memory, the processor causes the node to modify a packet, received over the UE interface, in accordance with information associated with context information associated with the UE; and transmit the modified packet over the network interface towards a destination.

In embodiments, the node can be a network access point or an Evolved NodeB (eNodeB). In a further embodiment, the UE interface is an air interface for receiving packets from the UE over a wireless link.

In a third aspect of the present invention, there is provided a method of routing a downlink packet addressed to a UE. The method comprises the steps of receiving a downlink packet addressed to a UE; determining, in accordance with the received downlink packet, context information associated with the UE; and transmitting the received packet towards the UE in accordance with the extracted context information.

In embodiments of the third aspect, the step of determining includes extracting information stored a packet header of the received packet. In other embodiments, the extracted information is the context information. In alternate embodiments the extracted information is an index, and the step of determining further includes the step of determining context information associated with the UE in accordance with the extracted index. In a further embodiment, the step of determining includes extracting information from an address associated with the UE in the received downlink packet.

In a fourth aspect of the present invention there is provided a network node for routing downlink packets addressed to a UE. The network node comprises a UE interface, a network interface, a memory, and a processor. The UE interface is configured for transmitting packets towards the UE. The network interface is configured for receiving packets addressed to the UE. The memory stores instructions. The processor is operatively connected to the UE interface, the network interface and the memory. Upon execution of the instruction stored in the memory, the processor causes the node to determine context information associated with the UE in accordance with information extracted from a packet received over the network interface; and transmit the received packet over the UE interface in accordance with the determined context information.

In an embodiment of the fourth aspect of the present invention, the node is one of a network access point and an Evolved NodeB (eNodeB). The UE interface can be an air interface for transmitting packets to the UE over a wireless link. The context information can be Radio Access Network (RAN) context information associated with the wireless link.

Description

The present disclosure is directed to methods and apparata to convey context information in a portion of a network address that is associated with one or more wireless devices, such as MTC devices 140, that may be disconnected from the network 100 for extended periods of time. Since the context information is conveyed in the context portion 296 of the source network address 270 in an UL packet 340 communicating information from the wireless device towards an external entity 110 that will be returned as a destination network address 280 in a DL packet 341 towards the device 350, no device-dependent context information is stored within the network 100 and little or no processing overhead is incurred.

This reduces and in some example embodiments eliminates storage of such context information within the network 100 (such as radio access link connection context at APs 131, 330, 331 for intermittently connected MTC devices 140) while still enabling communications with the MTC device 140 without incurring significant processing overhead.

Furthermore, the method provides a late binding of a dynamically assigned IP address 295 to a wireless device 350 in a manner that does not involve any knowledge or processing on the part of the wireless device 350. Such dynamic address assignment and late binding may facilitate lower complexity and concomitantly lower cost wireless devices 350, lower battery usage by the wireless device 350, lower provisioning and maintenance costs and any combination of any of these. Moreover, the wireless device 350 may be assigned an IP address automatically that matches the characteristics, (current) location of the wireless device 350 and any combination of any of these.

Further, device-specific M2M protocols may be encapsulated in a device-independent manner. For example, when an UL transmission 351 is received from a wireless MTC device 350, the receiving AP 330 may encapsulate the received information into an IP packet 340 without inspecting the information, construct a source IP address 270, that provides, in a context portion 296 thereof, context for communicating with the wireless device 350, and forward the resulting UL IP packet 340 to an MTC-IWF 120 or to an RCN 110.

The method allows ensuing DL packets 341 to be forwarded through the network 100 without employing tunnels, with a corresponding reduction or elimination of overheads associated with specialized mobility-aware protocols, such as discussed in IETF RFC 5213, "Proxy Mobile IPv6", August 2008, <http://tools.ietf.org/html/rfc5213>.

Furthermore, the method eliminates control signalling associated with IP address 295 binding in conventional solutions, such as discussed in IETF RFC 5213, "Proxy Mobile IPv6", August 2008, <http://tools.ietf.org/html/rfc5213>, with a corresponding reduction in overhead associated with a change in the point of attachment of the MTC device 140.

Those having ordinary skill in this art will appreciate that while reference is made in this disclosure to MTC devices, the method actions described herein may equally encompass communications to and from non-MTC wireless devices and that apparata described herein may equally encompass non-MTC wireless devices.

The rapid new development, continued growth and the worldwide adoption of M2M technology, calls for an extremely large address space, such as is provided for with Internet Protocol Version 6 (IPv6). In this disclosure, IPv6 packets may be referred to interchangeably as IP packets.

Figure 2:
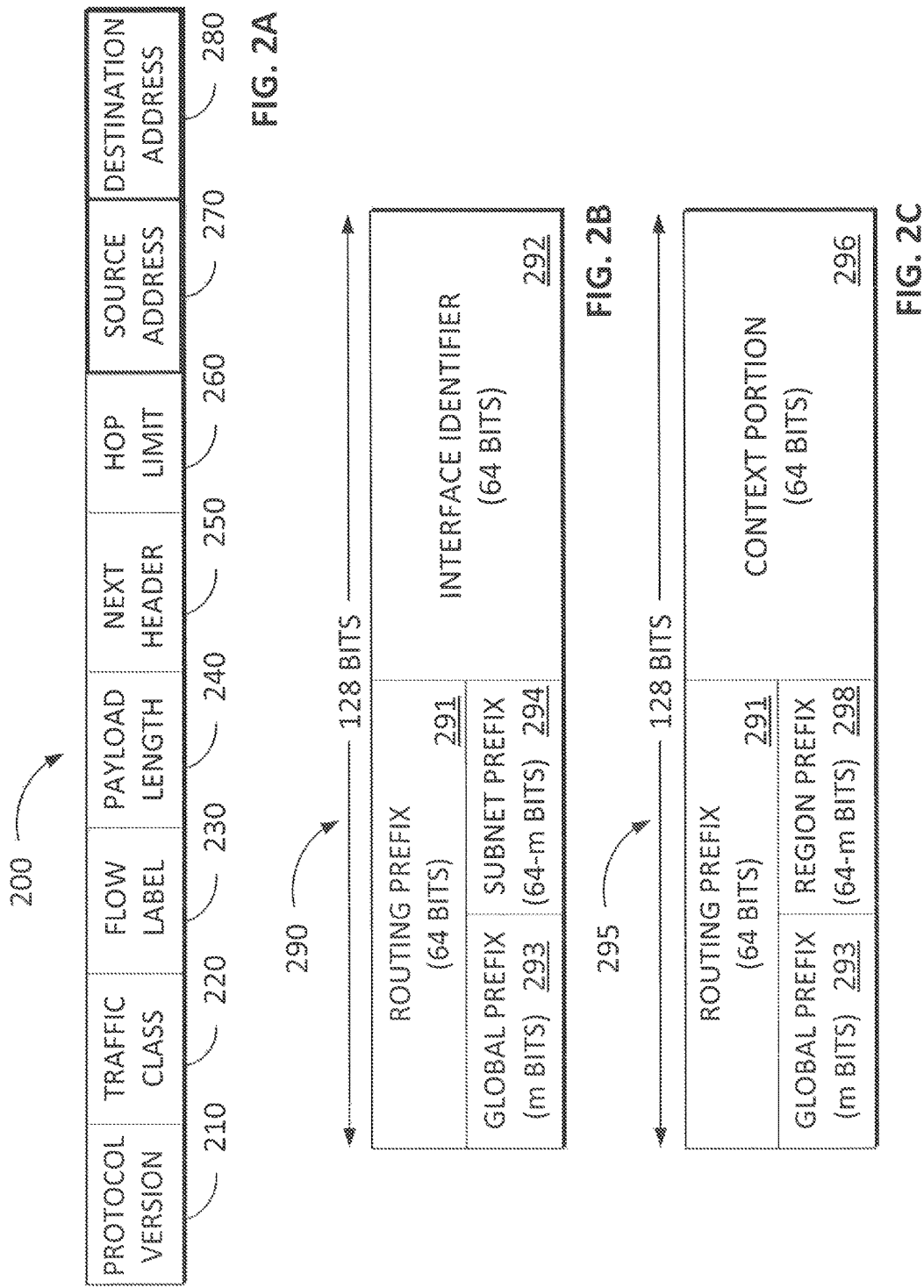
FIG. 2A is an example format of an IPv6 packet header.
FIG. 2B is an example format of a conventional IPv6 address that occupies a source or destination address field of FIG. 2A.
FIG. 2C is an example format of an IPv6 address that occupies a source or destination address field of FIG. 2A, with an embedded context portion instead of the interface identifier, according to an example embodiment of the present disclosure.

FIG. 2A is an example format of an IPv6 packet header shown generally at 200. While in this description, IPv6 addressing conventions are referenced for purposes of illustration only, those persons having ordinary skill in this art will appreciate that other addressing schemes may be employed as well.

As disclosed in IETF RFC 2460, "Internet Protocol, Version 6 (IPv6) Specification", December 1998, <http://tools.ietf.org/html/rfc2460>, the packet header 200 may comprise a number of fields, including without limitation, in some example embodiments, some or all of a protocol version 210, traffic class variable 220, flow label 230, payload length parameter 240, a next header pointer 250, a hop limit parameter 260, a source address field 270 and a destination address field 280.

The traffic class variable 220, in the context of IPv6, is a field, which in some example embodiments is an 8-bit field, that was originally intended to define the QoS treatment to be applied to a packet by intervening routers. However, the traffic class variable 220 under IPv6 may only have significance in one direction and would not affect the treatment of flows travelling in a reverse direction. Furthermore, the traffic class variable 220 is not necessarily preserved end-to-end but may be changed anywhere along the path from the packet source to its destination.

The flow label 230, in the context of IPv6, is a field, which in some example embodiments is a 20-bit field, that was originally intended to identify packets constituting a single flow, in order to simplify flow processing by intervening routers. However, as with the traffic class variable 220, the flow label 230 under IPv6 may only have significance in one direction and would not identify flows travelling in the reverse direction. Likewise, the flow label 230 is not necessarily preserved end-to-end but may be changed anywhere along the path from the packet source to its destination.

In some example embodiments, the source address field 270, the destination address field 280 or both may have a format such as shown in FIG. 2B, as disclosed in RFC 4291, "IP Version 6 Addressing Architecture", February 2006 <http://tools.ietf.org/html/rfc4291>. The example IPv6 unicast address structure shown in the figure, shown generally as 290, may comprise 128 bits divided into two 64-bit portions, respectively designated as a routing prefix 291 and an interface identifier 292.

The routing prefix 291, which constitutes the most-significant (left-most) bits of the address 290, and in some example embodiments may be 64 bits long, comprises routing information to be used by intervening routers between a source node, such as a wireless MTC device 140, and a destination node or RCN such as the AS 110. The routing prefix 291 may in some example embodiments be subdivided into to sub-fields, namely an m-bit global prefix 293, where 0≤m≤64 and a (64-m)-bit subnet prefix 294.

The global prefix 293 may be used for routing within the Internet-at-large. Reachability to network addresses 290 using this global prefix 293 is advertised by border gateway (BG) routers 115. The subnet prefix 294 may be used for routing within a local network (not shown). Reachability to network addresses 290 using this subnet prefix 294 is advertised by an interior site router (not shown) that is located between the BG 115 and the AP 131.

The interface identifier 292, which is a portion of the address 290 that constitutes the least significant (right-most) bits, which in some example embodiments may be 64 bits long, conventionally denotes an interface on an end node, often encoded as the Ethernet Media Access Control (MAC) address associated with a network interface on a wireless device (not shown).

Particularly in the context of mobile wireless devices, an IP address 290 assigned to such a device may not reflect the current point of attachment to the RAN 130. As such, it may not represent a particularly instructive construct.

However, it has been recognized that the bits of the address 290 that constitute a portion 292, conventionally (in IPv6) designated as the interface identifier, collectively exhibit some valuable characteristics. A first such characteristic is that, once populated, the portion 292 is imparted in the packet flow through the network in one direction and is copied from the source address 270 to the destination address 280 for packets transmitted in the reverse direction, where it again is imparted in the packet flow through the network in the reverse direction.

Thus, in the present disclosure as shown in FIG. 2C, a portion of the address 290, represented by the portion that is conventionally designated as the interface identifier 292 in IPv6, corresponding to one of the header address fields 270, 280, is re-designated herein as the context portion 296, which contains information that is specific to a context associated with a wireless device and the re-designated network address is denoted as 295.

The context portion 296 may, in some example embodiments, be generated when every UL packet 340 flow is initiated between a wireless device 350 and the RCN 110.

Figure 3:
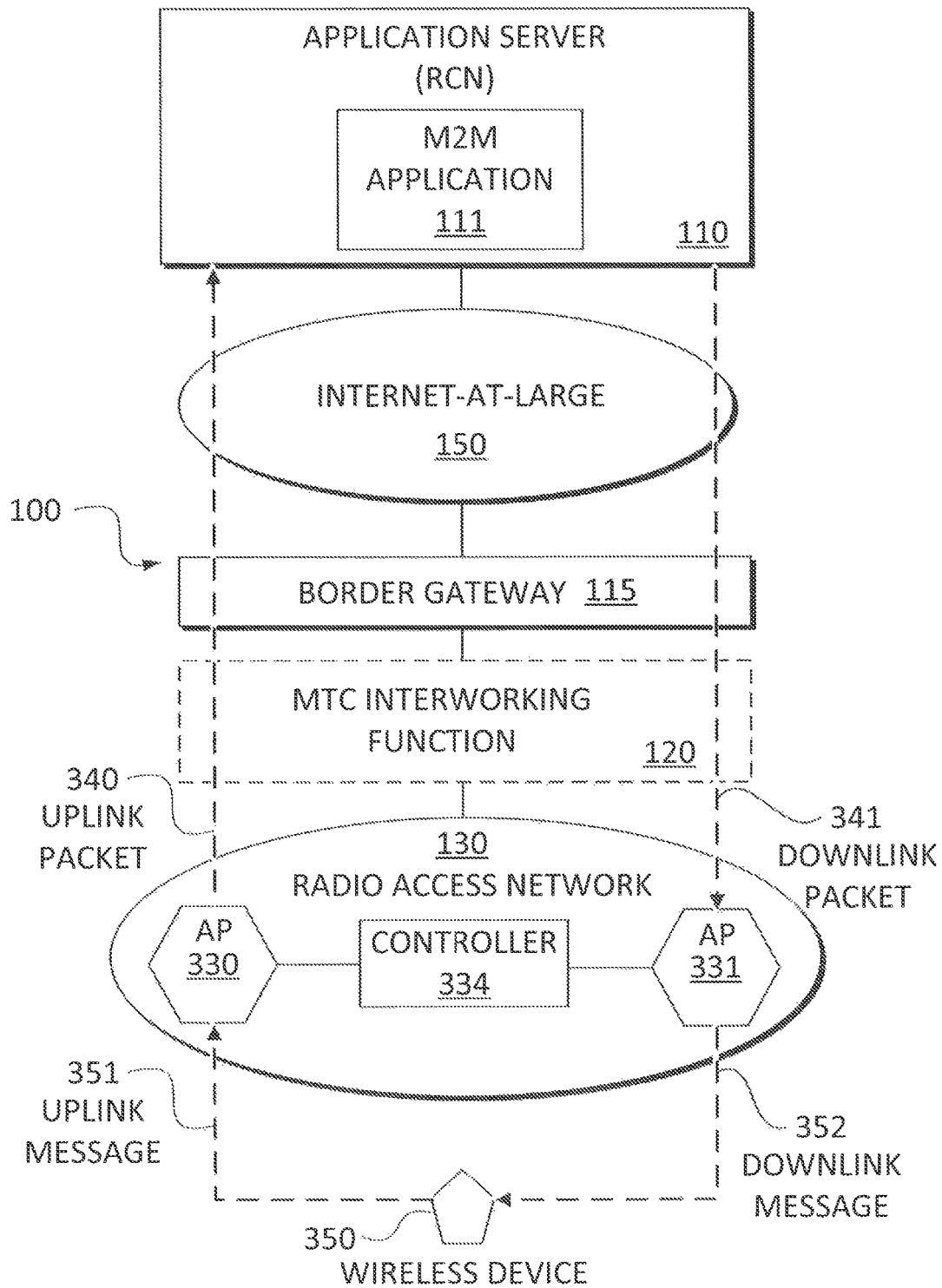
FIG. 3 is a schematic view of an example configuration of certain functional elements of a wireless network, including an optional MTC inter-working function.

Turning now to FIG. 3, there is shown a more generic version of FIG. 1. While in FIG. 1, only one AP 131 is shown, in general, the RAN 130 may comprise a plurality of APs 330, 331. In FIG. 3, by way of example only, two APs 330, 331 are shown. A given wireless device 350 may communicate with a first AP 330 for UL packets 340 and with a second AP 331 for DL packets 341.

Those having ordinary skill in this art will appreciate that each of the APs 330, 331 may have a plurality of wireless devices 350 in communication therewith. In some example embodiments, AP 330, which is shown in the context of wireless device 350 receiving UL messages 351 therefrom, may communicate UL messages 351 and/or DL messages 352 with one or more of such other wireless devices 350. Similarly, in some example embodiments, AP 331, which is shown in the context of wireless device 350 transmitting DL messages 352 thereto, may communicate UL messages 351 and/or DL messages 352 with one or more of such other wireless devices 350.

In some example embodiments, there is coordination between APs 330, 331 to facilitate communications with a given wireless device 350. In some example embodiments, an access point controller 334 is employed to provide direction to both APs 330, 331. In some example embodiments, one or the other of the APs 330, 331 may be or may comprise the controller 334.

The context portion 296 may, in some example embodiments, be inserted into the source address 270 in the IP header 200 of an UL packet 340 when a radio edge network node such as AP 330 receives an uplink message 351 that results in the initiation of a new packet flow. In some example embodiments, an identical context portion 296 may be similarly inserted into the source address 270 in the header 200 of each UL packet 340 in such packet flow.

While in this disclosure, the context portion 296 of UL packet(s) 340 is initially populated with context information and is copied to subsequent DL packet(s) 341, in some example embodiments, the context portion 296 of DL packet(s) 341 could be initially populated with context information. For example, the M2M application 111 may be configured with the IP address 295 assigned to a non-mobile device 350 where the IP address 295, when inserted into the destination address 280 of a DL packet 341, comprises context information in the embedded context portion 296 thereof, that may be used by the serving AP 331 to communicate with the wireless device 350.

While in this disclosure, an AP 131, 330, 331 is shown as populating the context portion 296, the context portion 296 could, in some example embodiments, be populated by the controller 334. Similarly, while in this disclosure, an AP 131, 330, 331 is shown as retrieving and interpreting the context portion 296, the context portion could, in some example embodiments, be retrieved and interpreted by the controller 334. In some example embodiments, the context portion 296 could be populated by the wireless device 350.

The assignment of the IP address 295 comprising the context portion 296 is dynamic and may be associated with the wireless device 350 only for the duration of the packet exchange between the wireless device 350 and the RCN 110. The context information contained in the context portion 296 may, in some example embodiments, be considered to be active for as long as there is a potential exchange of packets associated with the context embedded thereby. When, however, the context changes, or the packet flow is terminated, the packet flow is considered to have finished, the IP address 295 containing the context portion 296 associated with the context information may be marked as inactive and is no longer associated with the wireless device 350. The IP address 295 comprising the context portion 296 may subsequently be associated with another packet flow associated with the same wireless device 350 or with a different wireless device 350.

The context portion 296 may be marked as inactive by the UL AP 330 whenever when the context associated with a packet flow changes or all of the packet flows associated with the context information in the context portion 296 are deemed to have ended. A packet flow may be determined to have ended by:
- a change in the radio link connectivity, as discussed in 3GPP TS 36.331, "Evolved Universal Terrestrial Radio Access Network (E-UTRAN); Radio Resource Control (RRC) protocol specification", <http://www.3gpp.org/ftp/Specs/html-info-36331.htm>;
- expiration of a packet flow inactivity timer (not shown);
- inspecting one or more fields from a transport protocol header or an application protocol header for information that can be used to deduce that there will be no further packets in the flow;
- identifying a change in or in the characteristics of the radio access link connection over which the downlink message 352 will be transmitted;
- identifying a change in or in the characteristics of the radio access link connection over which the uplink message 351 was received; and
- any combination of any of these.

In some example embodiments, the wireless device 350, the MTC-IWF 120, the BG 115, the M2M application 111, the DL AP 331, the controller 334 and any combination of these may also provide information that may assist in identifying the end of a packet flow.

When a DL packet 341 having context information in the context portion 296 of its destination address 280 is received by the AP 331, the context information may be used by the AP 331 to deliver a corresponding downlink message 352 over a radio link 160 to the wireless device 350.

In some example embodiments, a DL packet 341 may be encapsulated using known IP mobility techniques, such as disclosed in 3GPP TS 29.281, "General Packet Radio System (GPRS) Tunnelling Protocol User Plane (GTPv1-U)", <http://www.3gpp.org/ftp/Specs/html-info/29281.htm> and IETF RFC 5213, "Proxy Mobile IPv6, August 2008, <http://tools.ietf.org/html/rfc5213>, in a tunnel packet for delivery to the AP 331.

In some example embodiments, recognizing that MTC packet flows tend to be short-lived, the context information embedded in the context portion of the destination address 280 of DL packets 341 may identify the serving AP 331, allowing the DL packets 341 to be forwarded directly to the AP 331, dispensing with tunnelling and control signalling overheads associated with specialised IP mobility protocols. In some example embodiments, the context information may identify additional network entities (including without limitation, MME, HLR, VLR, HSS and VNF entity) that may be queried for additional information.

In some example embodiments, multiple packet flows 340 emanating from the wireless device 350, may employ common radio resources or otherwise share a common context. In such example embodiments, these packet flows 340 may share a common context portion 296. Those having ordinary skill in this art will appreciate that existing techniques may be used to distinguish such flows by considering fields outside the header 200, such as, by way of non-limiting example, the port number in an encapsulated TCP or user datagram protocol (UDP) header.

In some example embodiments, the overhead of dealing with a large number of MTC devices 140 may be alleviated through group-based communications, such as disclosed in 3GPP TS 23.769, "Machine-Type Communications; Group based Enhancements", <http://www.3gpp.org/ftp/Specs/html-info/23769.htm>, in which different packet flows 340, emanating from different MTC devices 140 that are served by a common AP 330, may also share a common context, especially for DL packet flows 341 from a common RCN 110. In such example embodiments, the UL packet flows 340 may share a common context portion 296 to encode context related to radio resource assignment for the group of devices 140, thus dispensing with retention of context information within the RAN 130.

Such embodiments may reflect multicast communications, in which data contained in the DL packet 341 may be intended for all of the wireless devices 350, or for only a subset of the wireless devices 350. That is, a plurality of wireless devices 350 may be considered to receive the same context or treatment. Those having ordinary skill in this art will appreciate that such wireless devices 350 may be identified and differentiated from other devices for which the data is not intended, by considering application-specific fields outside the header 200, such as, by way of non-limiting example, including an identifier identifying a given wireless device 140 as application data in the packet payload, or such as, by way of non-limiting example, using the port number in an encapsulated TCP or UDP header or a CoAP group uniform resource identifier (URI).

Those having ordinary skill in this art will also appreciate that the network address in which the multicast context information has been encoded into the context portion 296, will be considered, from an IPv6 perspective, as discussed in RFC 4291, "IP Version 6 Addressing Architecture", February 2006, <http://tools.ietf.org/html/rfc4291>, as a unicast address rather than a multicast address. Rather, the multicast group will be solely defined by the set of MTC devices 140 that have been instructed, through manipulation of the context portion 296, as described herein, to listen to transmissions having a given context, for instance, by way of non-limiting example, on a particular set of radio resources. The multicast nature of the packets 341 will be apparent only to the AP 331, and to the AP(s) 131, 330, and/or controller 334 that encoded or mandated the encoding of the common context portion 296 received in the DL packet(s) 341.

In some example embodiments, the routing prefix 291 is maintained in the most significant (left-most) 64 bits of the address 295. In some example embodiments, the subnet prefix 294 may be substituted for by a region prefix 298 that may be used for routing within a RAN 130 in order to limit the scope of the context portion 296. Thus, when the RCN 110 responds, the source address 270 in the received UL packet 340, which includes the context portion 296, is copied into the destination address 280 of the reply DL packet 341 by the RCN 110.

Thus, a second such characteristic is that the IP address 295, including the context portion 296, is conveyed in packets between nodes in both directions. This provides an immutable, two-way, end-to-end transfer of the context information for the packet flow.

A third characteristic particular to the portion 292 conventionally designated as the interface identifier in IPv6 is that the routing prefix 291 is used for making forwarding decisions within the network 100 and that the portion 292 is not used for making such forwarding decisions.

The AP 330 may thus also insert a routing prefix 291 and related information into the source address 270 of the UL packet 340 that will allow a returning DL packet 341 to be forwarded to the appropriate AP 331.

The continued use of the routing prefix 291 and the above-referenced characteristics of the context portion 296 means that while the packet header 200 conveys information about the context associated with the packet flow, conventional off-the-shelf routers can continue to be used in the network 100, dispensing with specialized routing protocols and packet forwarding engines. Moreover, conventional router forwarding mechanisms such as a longest prefix match may be employed. Further, the context portion 296 may be used to route packets according to the demands of that flow and independently of the demands of other flows associated with a particular wireless device 350. For example, different flows may be forwarded through different paths in the network 100 according to resource availability and the QoS associated with a flow.

The context information embedded in the context portion 296 of the source address 270 of the UL packet(s) 340 encodes context, including radio resource context, that may be subsequently used by the AP 331 to communicate with the wireless device 350 when DL packets 341 are received from the RCN 110 at a later point in time.

The context information to be populated within the context portion 296 of the source address 270 of the UL packet(s) 340 may be derived by the AP 330 based on information available to it, including without limitation:

one or more fields from the IP header, a transport protocol header (including without limitation, TCP/UDP), or an application protocol header (including without limitation, HTTP or CoAP);

one or more characteristics of the radio access link connection over which the UL message 351 was received;

one or more characteristics of the radio access link connection over which the corresponding DL message 352 will be transmitted;

the identity of a network node housing information related to the wireless device;

the communications protocol(s) used to communicate with the wireless device;

the type of wireless device (including, without limitation, mobile or fixed); and the class of wireless device (including, without limitation, an MTC device or HTC device).

In some example embodiments, the MTC device 140 itself may also provide information that may assist in identifying new packet flows and classifying such packet flows for purposes of determining context information to be populated within the context portion 296 of the source address 270 of the UL packet 340, including without limitation, information encoded in the IPv6 packet header (including without limitation, the Traffic Class 220, Flow Label 230 and any combination of any of these), information encoded as a reserved value (not shown) of the IPv6 source address 270, information over the radio access link connection (including without limitation, in a MAC Control Element , as discussed in 3GPP TS 36.321, "Evolved Universal Terrestrial Radio Access Network (E-UTRAN); Medium Access Control (MAC) protocol specification", <http://www.3gpp.org/ftp/Specs/html-info/36321.htm>), information in a transport protocol header (including, without limitation, TCP), information in an application protocol header (including, without limitation HTTP and CoAP), and any combination of any of these.

In some example embodiments, context information to be populated within the context portion 296 of the source address 270 of the UL packet 340, may be identified from instructions received from a Radio Resource Management (RRM) entity (not shown), a Traffic Management (TM) entity (not shown), the MTC-IWF 120, the BG 115, the M2M application 111, the DL AP 331, the controller 334, and any combination of any of these.

In some example embodiments, the context information to be embedded and retained may identify one or more of the following context aspects:

a radio (access) transmission group, comprising for example, one or more APs 131;

a serving AP 131, 331, a controller 334 and the wireless device(s) 350 associated with the packet flow 341;

a radio access link connection, comprising for example, one or more DL channels where a channel is comprised of some combination of time, frequency, spatial and coding resources;

one or more radio link transmission parameters, comprising for example, one or more of a modulation and/or coding scheme, a transmit power level, a precoding matrix and the like;

a radio link transmission opportunity, comprising by way of non-limiting example, one or more of a set of transmission resources and schedule for their use;

a paging group, comprising for example, one or more APs 131;

a paging opportunity, comprising for example, one or more of a set of paging resources and a schedule for their use;

a pre-defined traffic-engineered path through the network 100 to the AP 331;

a QoS parameter, including without limitation, allowable delay, allowable packet loss and battery consumption parameters;

the identity of a network node housing information related to the device;

the communications protocol(s) used to communicate with the wireless device;

a service function chain (SFC); and a logical identifier that does not describe an inherent characteristic of the MTC device 140, but which may be used for example, to define a path through the network 100, to access a store, such as a flow descriptor database (not shown) containing detailed information regarding the packet flow or a radio resource context database (not shown) in which context information comprising one or more of the above context aspects is maintained. In some example embodiments, the identifier may be opaque in that the nature of the information it represents cannot be discerned from consideration of the identifier only.

Since a given one or more of the context aspects (of which the foregoing are only a non-limiting example subset) may be used, alone or in combination, the bits in the context portion 296 may be allocated according to the context information that is conveyed in the context portion 296. In some example embodiments, aspects of the context may be embedded directly into the context portion 296 as a numerical value. In some example embodiments, aspects of the context may be embedded into the context portion 296 as a pointer into a table of numerical values.

To accommodate a wide variety of combinations of context information, in some example embodiments, a number of format classes may be defined. By way of non-limiting examples, FIG. 4 shows example format classes, identified by a letter designation, such as A 410, B 420, C 430, D 440, E 450, F 460 respectively corresponding to six different context portions 412, 422, 432, 442, 452, 462. Those having ordinary skill in the relevant art will appreciate that format classes corresponding to additional and/or different combinations of context information may be equally identified.

In the non-limiting example embodiments of FIG. 4, the most significant (64-n) bits of the context portion 296, where n is the number of bits in the context portion 412, 422, 432, 442, 452, 462, comprises a (64-n) bit format identifier 411, 421, 431, 441, 451, 461. In some example embodiments, the format identifier 411 for the 63-bit context portion 312 is a "0". In some example embodiments, the format identifier 421, 431, 441, 451, 461 comprises a pre-defined 7-bit code "yyyyyyy", where 0≤yyyyyyy≤1111110, padded by leading "1"s. The padding of the most-significant (64-n) bits of the context portion 296 with leading "1"s of varying length (including 0) allows the different format classes to be differentiated from one another.

Depending upon which, and how many of these context aspects are conveyed, one or more of the format classes may be adopted.

Based on the context aspect(s) that are to be conveyed to AP 331, the AP 330 identifies a format class and/or format and inserts appropriate information in the field(s) thereof.

By way of non-limiting example, FIG. 5 shows example formats for a variety of format classes with corresponding format identifiers m, n, p, and 0. FIG. 5A shows an example format, designated m 510, of the format class C, with a context portion 432 that contains a path identifier 511, and a radio bearer identifier 512. This format and context aspect may be used to forward traffic to an AP 331 over a pre-defined traffic-engineered path identified by the path identifier 511, for delivery over the radio access link connection identified by the radio bearer identifier 512.

Figure 5A:
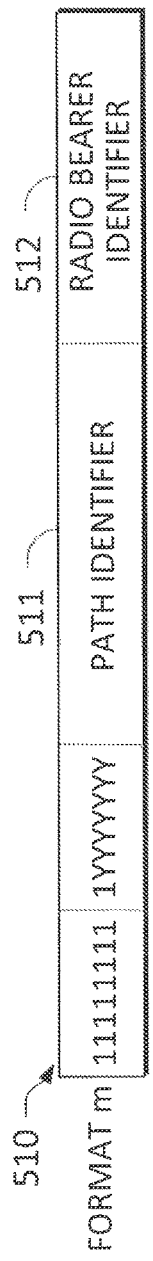
FIGS. 5A-5D shows example formats encapsulating context information within the embedded context portion of the IPv6 address of FIG. 2C.
Figure 5B:
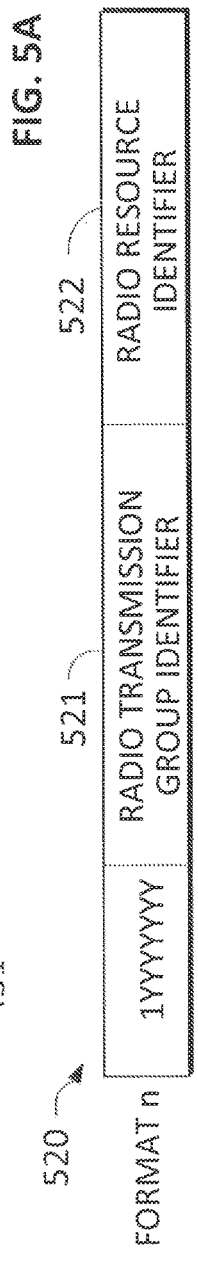

FIG. 5B shows an example format, designated n 520, of format class B, with a context portion 422 that contains a radio transmission group identifier 521, and a radio resource identifier 522. This format and context aspect may be used to transmit traffic through a group of radio transmission points identified by the radio transmission group identifier 521, using the radio resources identified by the radio resource identifier 522.

In one example embodiment, such context may be employed when the device 350 is in an active state and listening for transmissions on the specified radio resources.

In one example embodiment, such context may be employed when a semi-persistent schedule of times has been identified when the wireless device 350 is known to be actively listening for DL unicast transmission on a specified set of radio resources.

In one example embodiment, such context may be employed in a multicast scheme to identify a semi-persistent schedule of times when the wireless devices 350 in the group are known to be actively listening for DL multicast transmission on a specified set of radio resources.

Figure 5C:
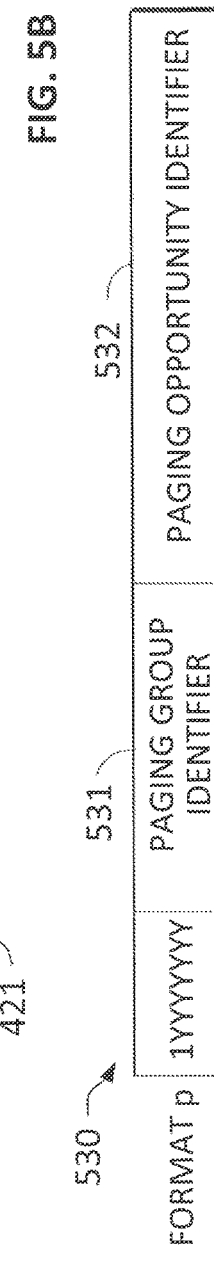

FIG. 5C shows an example format denoted p 530, of format class B, with a context portion 422 that contains a paging group identifier 531 and a paging opportunity identifier 532. This format and context aspect may be used to send an alert through the group of radio transmission points identified in the paging group identifier 531, using the schedule of paging opportunities identified in the paging opportunity identifier 532.

In one example embodiment, the context defines a paging group and a set of paging opportunities that can be used to alert the wireless device 350 that the network 100 has DL traffic buffered for the wireless device 350. This embodiment may be used, for example, when the wireless device 350 is in a low-power battery state or when the wireless device 350 does not have any DL radio resources assigned.

Figure 5D:
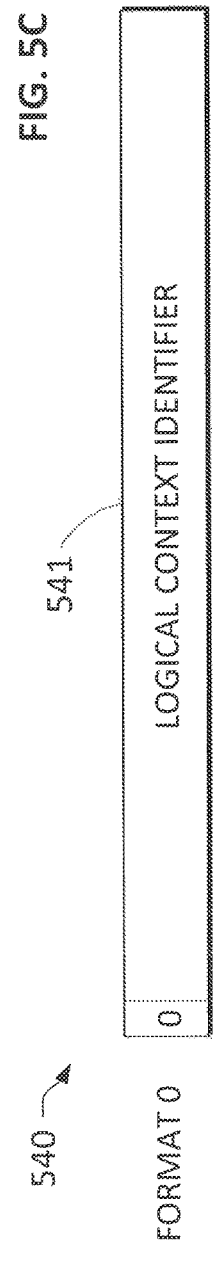

FIG. 5D shows an example format denoted 0 540, of format class A 410, with a context portion 412 that contains a logical context identifier 541 that does not describe an inherent characteristic of the wireless device 350, but which may be used to define a path through the network 100 or to access a store, such as a flow descriptor database (not shown) containing detailed information regarding the packet flow or a radio resource context database (not shown) in which one or more context aspects is maintained.

Those having ordinary skill in the relevant art will appreciate that formats corresponding to additional and/or different context aspects may be equally identified.

Once the context portion 296 of the source address 270 of the UL packet 340 has been populated as described above, where appropriate, the source address 270 may be completed by inserting a routing prefix 291 associated with the serving AP 131, 330, 331 or controller 334 into the source address 270. This will allow a returning DL packet 341 whose destination address 280 is copied from the source address 270 of the UL packet to be forwarded to an appropriate serving AP 131, 330, 331 or controller 334.

Example Scenarios

Figure 6:
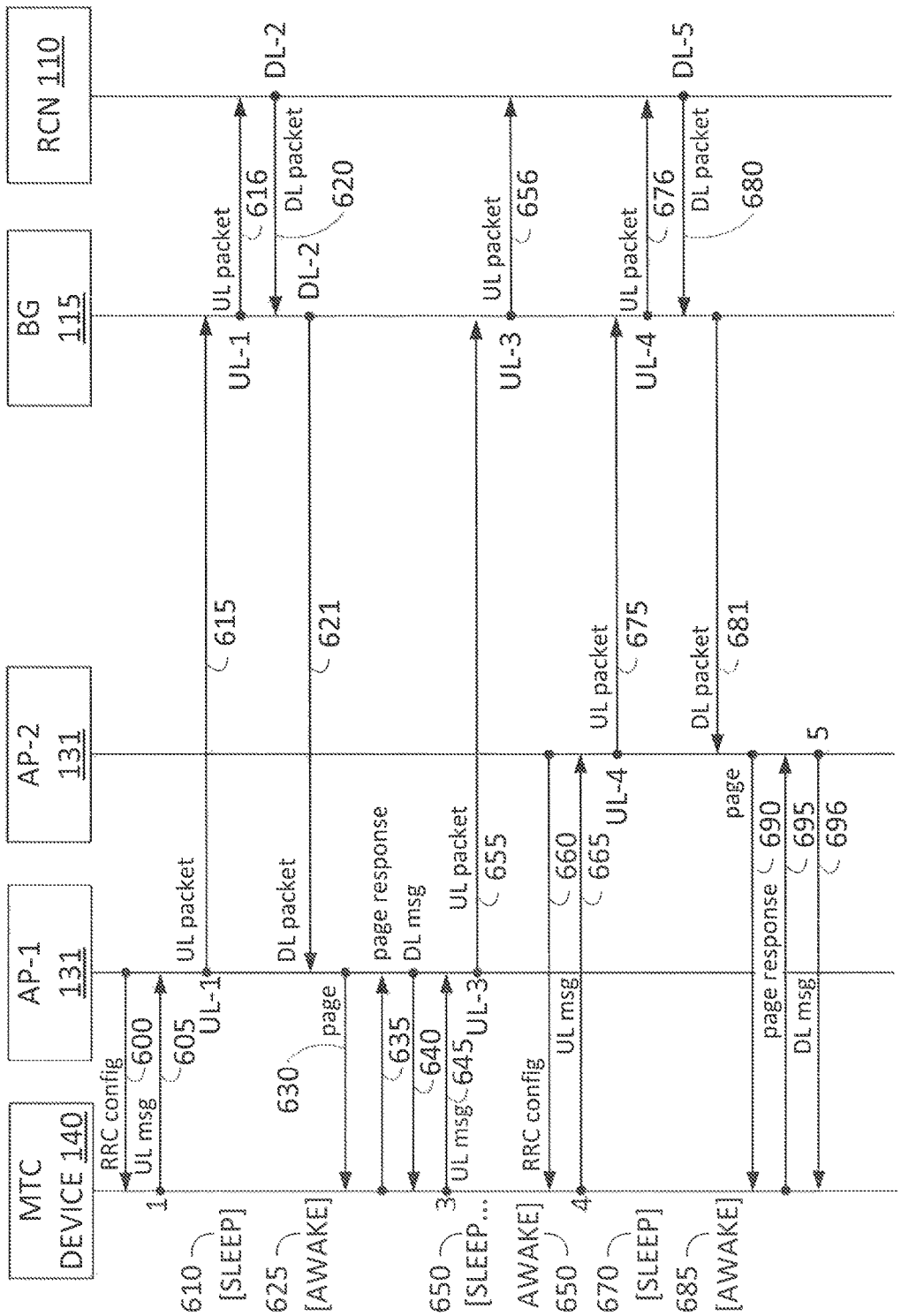
FIG. 6 is an example message flow diagram for a scenario in which the embedded context portion of FIG. 2C of a network source address field of uplink packet(s) is populated with paging information assigned for delivery of downlink unicast traffic to an MTC device according to an example embodiment of the present disclosure.
Figure 7:
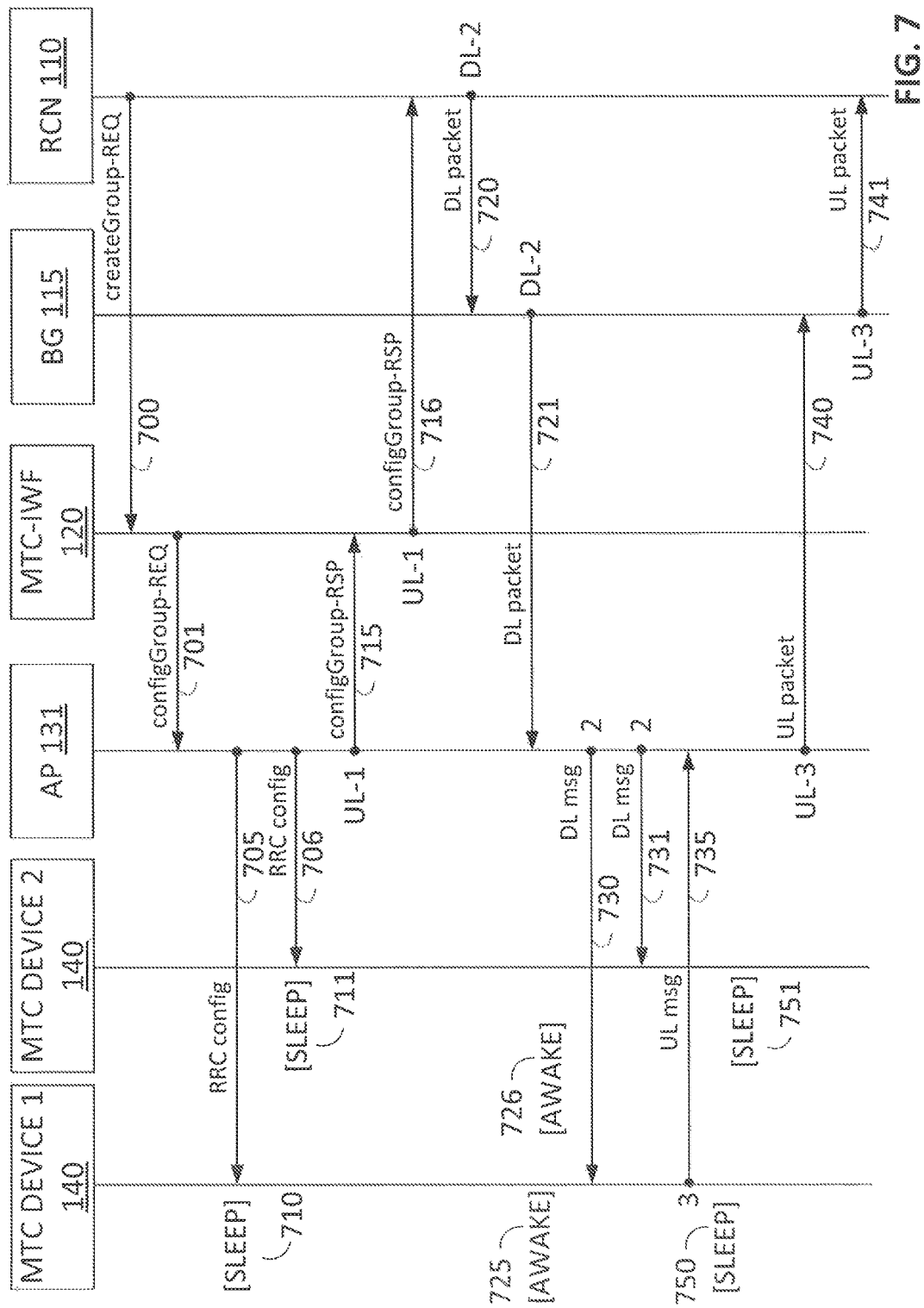
FIG. 7 is an example message flow diagram for a scenario in which the embedded context portion of FIG. 2C of an assigned network address is populated with transmission information assigned for delivery of downlink multicast traffic to a plurality of MTC devices according to an example embodiment of the present disclosure.

Turning now to FIGS. 6 and 7, there are shown two example embodiments describing typical scenarios in which context information is retained and embedded in the context portion 296 of packet flows between an MTC device 140 and a RCN 110.

Unicast Paging Example Scenario

FIG. 6 is an example message flow diagram for a scenario in which paging information is populated in the context portion 296, of a network address field 295 assigned for delivery of downlink unicast traffic to a wireless device 350 such as MTC device 140 and conveyed in uplink packet(s) 340. In this scenario, it is assumed that at any given time, a single serving AP 131 handles both the UL and DL packets, such as is shown in FIG. 1. Those having ordinary skill in this art will appreciate that the scenario could be extended to the configuration shown in FIG. 3, in which separate APs 330, 331 handled UL 340 and DL 341 packets separately.

Those having ordinary skill in this art will appreciate that the scenario could be further extended to a configuration (not shown) in which one node, such as, without limitation, an AP 131, 330, 331, an access router (not shown), controller 334 and/or an MTC-IWF 115 could unpack context information from a context portion 292 of a network address 295 and a separate node, such as, without limitation, an AP 131, 330, 331 and/or an AP controller 334 could apply the context information to DL packet 341 flows.

In this scenario, when the MTC device 140 becomes associated with an initial serving AP-1 131, AP-1 131 transmits 600 a control message 352 using Radio Resource Control (RRC) signalling, such as is discussed in 3GPP TS 36.331, "Evolved Universal Terrestrial Radio Access Network (E-UTRAN); Radio Resource Control (RRC) protocol specification", <http://www.3gpp.org/ftp/Specs/html-info-36331.htm> to the MTC device 140 to configure the MTC device 140 with a schedule of paging opportunities for use with AP-1 131.

At some point in time thereafter, the MTC device 140 sends 605 an unsolicited UL message 1 351 to an application, such as M2M application 111 on an RCN 110, such as the AS. The UL message 1 351 informs M2M application 111 that the MTC device 140 is active. Such a message may, in some example embodiments, utilize a protocol optimized for machine-type communications, such as CoAP. In such protocol, UDP or TCP may be used as the transport protocol with the IP address 295 of the RCN 110 included in the destination identifier of the UL message 1. The message may, in some example embodiments, use application-layer identifiers instead of IP addresses 295, for the sender and recipient of the message, respectively an MTC device 140 identifier and an RCN 110 identifier may be used to identify the end-to-end session. In some example embodiments, these may be uniform resource identifiers (URI).

After sending this message, the MTC device 140 may, at some point in the absence of active communications, enter a low-power or sleep state 610 to conserve battery power, until the next scheduled paging opportunity at which point it will awaken.

When the UL message 1 351 is received 605 by AP-1 131, a context portion 296 of an IP address 290 is populated with context information that specifies the current point of attachment and the means of DL communication with the MTC device 140 over the radio link 160. In particular, in some example embodiments, the populated context information identifies the schedule of paging opportunities that was configured into the MTC device 140 by message flow 600, such as, in some example embodiments, by providing an index into a preconfigured table or a number that is used to seed an algorithm for computing the opportunities. The context information may be determined by AP-1 131, by the controller 334, by a separate RRM entity or Traffic Management (TM) entity (not shown), and any combination of any of these. The context portion 296 is then inserted, along with a local routing prefix 291 into the source address 270 of an IP packet 340, that will allow a returning DL packet 341 to be forwarded to AP-1 131. In some example embodiments, AP 131 may generate an IP address 295 that includes the context portion 296 and the routing prefix 291 and communicate the address 295 in, without limitation, an RRC message 352 (not shown) to the device 350, whereupon the device 350 would insert the IP address 295 into the source address 270 of an IP packet header 200 before transmitting the packet 351 to the AP 131. The resulting IPv6 packet UL-1 340 is transmitted 615 by AP-1 131 to the BG 115. Those having ordinary skill in this art will appreciate that while in the Figure, only one BG 115 is shown, any given UL packet 340 and DL packet 341 and any combination of any of these may employ a different BG 115.

In some example embodiments, BG 115 may perform a stateful Network Address Translation operation, such as disclosed in RFC 2663 "IP Network Address Translator (NAT) Terminology and Considerations", August 2009, <https://tools.ietf.org/html/rfc2663>, that results in storage of at least one of the context portion 296 of the source IP address 270 and the routing prefix 291 of the source IP address 270 within the BG 115 and replacement of the source IP address 270 by a NAT IP address (not shown). BG 115 in turn forwards 616 IPv6 packet UL-1 340 to the RCN 110.

At some point in time thereafter, RCN 110 sends 620 a message in an IPv6 packet DL-2 341 towards the MTC device 140. The packet has the destination address 280 taking on the value that was encoded into the source address 270 of IP packet UL-1 340 received 616 by the RCN 110. This packet is received 620 by the BG 115.

If the BG 115 performed a Network Address Translation operation before forwarding the IPv6 packet UL-1 616, BG 115 retrieves the at least one of the stored context portion 296 and routing prefix 291 and inserts them into the destination address 280 of the IPv6 DL packet DL-2 341. BG 115 in turn forwards 621 IPv6 DL packet DL-2 341 to the RAN 130. The context information populating the context portion 296 of the destination address 280 will be used to forward 621 the DL packet DL-2 341 to AP-1 131.

When DL packet DL-2 341 is received 621 by AP-1 131, AP-1 131 retrieves the context information populating the context portion 296 of the destination address 280 of the packet DL-2 341 and applies it to govern how DL message(s) 352 should be delivered to the MTC device 140. In some example embodiments, the context information is derived from the context portion 296 by the controller 334 or by an RRM entity (not shown) or a TM entity (not shown) and communicated to AP-1 331. The context information in the context portion 296 is opaque to, and is not interpreted by, the RCN 110. Therefore, the RCN 110 will not time its transmission 620 of DL packet DL-2 341 to coincide with the transmission schedule established between AP-1 131 and the MTC device 140. Those having ordinary skill in the relevant art will appreciate that as the reception 621 of DL packet DL-2 341 is not synchronized with the radio link paging schedule established by AP-1 131 with the MTC device 140, AP-1 131 may be called upon to buffer the packet until the next scheduled paging opportunity for transmitting information to the MTC device 140.

When the next scheduled paging opportunity arrives, the MTC device 140 awakens 625 and restores power to its receiver. It thereupon monitors DL control channel (DCCH) transmissions from AP-1 131.

As it has buffered message(s) to transmit, at some point during the scheduled paging opportunity, AP-1 131 transmits 630 an indication, in the form of a DCCH page message 352 to the MTC device 140, that AP-1 131 has one or more buffered DL messages 352 that are awaiting transmission to the MTC device 140.

When the MTC device 140 detects 630 this page 352, it transmits 635 an acknowledgement to AP-1 131 using a suitable page response message 351, which may be a Random Access CHannel (RACH) or a UL Contention-Based Channel (CBCH) message, as defined by an established air interface protocol.

When AP-1 131 receives 635 the page response message 351, it allocates DL radio resources, in some example embodiments based on current radio link conditions to the MTC device 140 and the size of the DL message 352, and transfers 640 the buffered message(s), including DL message 2 352 to the MTC device 140.

Upon receipt 640 of the DL message 2 352, the MTC device 140 constructs a response message 3 351 where, in some example embodiments, the destination identifier is copied from the source identifier received 640 in the message 2 352, and transmits 645 the response message 3 351 over an uplink channel to AP-1 131.

After sending this message, the MTC device 140 may at some point in the absence of active communications, enter a low-power or sleep state 650 to conserve battery power, until the next scheduled paging opportunity at which point it will awaken.

When the message 3 351 is received 645 by AP-1 131, a context portion 296 of an IP address 295 is populated with context information that specifies the current point of attachment and the means of DL communication with the MTC device 140 over the radio link 160. In particular, the populated context information identifies the schedule of paging opportunities that was configured into the MTC device 140 by message flow 600 or otherwise. The context portion 296 is then inserted, along with a local routing prefix 291 into the source address 270 of the IP packet 340, that will allow a returning DL packet 341 to be forwarded to AP-1 131. The resulting IPv6 packet UL-3 340 is forwarded 655 by AP-1 131 to the BG 115.

In some example embodiments, the context portions 296 of UL packets UL-1 340 and UL-3 340 may be the same if the context of the MTC device 140 has not changed. However, if the context has changed, such as, by way of non-limiting example, the schedule of paging opportunities has changed (such as by transmission of RRC messages similar to message flow 600), then the initial context portion CP1 296 of UL packet UL-1 340 will be invalid and the new context portion CP2 296 of UL packet UL-3 340 will be employed.

BG 115 in turn forwards 656 packet UL-3 340 to the RCN 110, after performing a NAT operation in some example embodiments.

At some point in time, the MTC device 140 awakens 650 and restores power to its receiver. It thereupon monitors DL control channel (DCCH) transmissions from AP-1 131, AP-2 131 and any combination of any of these.

At this point, the MTC device 140 becomes associated with a new serving AP 131, designated AP-2 . AP-2 131 transmits 660 a control message 352 using RRC signalling to the MTC device 140 to configure the MTC device 140 with a new schedule of paging opportunities for use with AP-2 131.

At some point in time thereafter, the MTC device 140 sends 665 a message 4 351 to an application, such as M2M application 111 on an RCN 110, such as the AS. Those having ordinary skill in this art will appreciate that the application may be the same or different from M2M application 111 on the same or a different RCN 110 from the AS. The message 351 informs M2M Application 111 that the MTC Device 140 is active.

After sending this message, the MTC device 140 may at some point in the absence of active communications, enter a low-power or sleep state 670 to conserve battery power, until the next scheduled paging opportunity at which point it will awaken.

When the message 4 351 is received 665 by AP-2 131, a context portion 296 of an IP address 695 is populated with context information that specifies the current point of attachment and the means of DL communication with the MTC device 140 over the radio link 160. In particular, in some example embodiments, the populated context information identifies the schedule of paging opportunities that was configured into the MTC device 140 by message 660, that is to say by the new serving AP-2 131. The context portion 296, designated CP3, is then inserted, along with a local routing prefix 291 into the source address 270 of the IPv6 packet 340 that will allow a returning DL packet 341 to be forwarded to AP-2 131. The resulting packet UL-4 340 is forwarded 675 by AP-2 131 to the BG 115.

BG 115 in turn forwards 676 packet UL-4 340 to the RCN 110, after performing a NAT operation in some example embodiments.

If thereafter, RCN 110 wants to send a message to the MTC device 140, it will generate a DL packet DL-5 341 which has the destination address 280 taking on the value that was encoded into the source address 270 of packet UL-4 340 received 676 by the RCN 110, namely incorporating context portion CP3 296. This packet 341 is forwarded 680 by the RCN 110 over the Internet-at-large 150 and is received 680 by the BG 115.

BG 115, after performing a NAT operation in some example embodiments, in turn forwards 681 DL packet DL-5 341 to the RAN 130. The context information populating the context portion 296 of the destination address 280 will be used to forward 681 the DL packet DL-5 341 to AP-2 131.

When DL packet DL-5 341 is received 686 by AP-2 131, AP-2 131 retrieves the context information populating the context portion 296 of the destination address 280 of the packet DL-5 341 and applies it to govern how DL message(s) 352 should be delivered to the MTC device 140. Those having ordinary skill in the relevant art will appreciate that, as the reception 621 of DL packet DL-2 341 is not synchronized with the radio link paging schedule established by AP-2 131 with the MTC device 140, AP-2 131 may be called upon to buffer the packet until the next scheduled paging opportunity for transmitting information to the MTC device 140.

When the next scheduled paging opportunity arrives, the MTC device 140 awakens 685 and restores power to its receiver. It thereupon monitors DL control channel (DCCH) transmissions from AP-2 131.

As it has buffered message(s) to transmit, at some point during the scheduled paging opportunity, AP-2 131 transmits 690 an indication, in the form of a DCCH page message 352 to the MTC device 140 that AP-2 131 has one or more buffered DL messages 352 that are awaiting transmission to the MTC device 140.

When the MTC device 140 detects 690 this page message 341, it transmits 695 an acknowledgement to AP-2 131 using a suitable page response message 351, which may, in some example embodiments, be a Random Access CHannel (RACH) or a Contention-Based Channel (CBCH) message.

When AP-2 131 receives 695 the page response message 351, it allocates DL radio resources and transmits 696 the buffered message(s) 352, including message 5 352 to the MTC device 140.

Multicast Transmission Example Scenario

FIG. 7 is an example message flow diagram for a scenario in which transmission information for delivery of DL multicast traffic to a plurality of MTC devices that constitute a group of MTC devices 140, is populated in the context portion 296 of a network address 295 in DL packet(s) 341. Two MTC devices 140 in the group, respectively designated MTC device 1 140 and MTC device 2 140 are shown by way of non-limiting example. Again, in this scenario, it is assumed that at any given time, a single serving AP 131 handles both the UL and DL packets for each of the MTC devices 140 in the group. Those having ordinary skill in this art will appreciate that the scenario could be extended to the configuration shown in FIG. 3, in which separate APs 330, 331 handled UL 340 and DL 341 packets separately. Those having ordinary skill in this art will appreciate that the scenario could be further extended to a configuration (not shown) in which one node, such as, without limitation, an AP 131, 330, 331, an access router (not shown), controller 334 and/or an MTC-IWF 115 could unpack context information from a context portion 292 of a network address 295 and a separate node, such as, without limitation, an AP 131, 330, 331 and/or an AP controller 334 could apply the context information to DL packet 341 flows.

At some point in time, an application, such as M2M application 111 on an RCN 110 such as the AS sends 700 a request packet 341 to an MTC-IWF 120 to create a multicast group of a collection of MTC devices 140 that are associated with M2M application 111, namely MTC device 1 and MTC device 2.

This request packet 341 is then forwarded 701 by the MTC-IWF 120 to one or more APs (by way of non-limiting example, only one AP is shown) 131 that may be serving MTC devices 140 in the group. In some example embodiments, the request packet may be forwarded to the controller 334, to a separate TM entity (not shown), RRM entity (not shown), and any combination of any of these, in addition to or instead of to AP 131.

When the request packet 341 is received 701 by the AP 131, the AP 131 uses RRC signaling to send 705, 706 and configure each of the target MTC devices 140 with a message 352 outlining a schedule of transmission opportunities that will be used by the AP 131. In some example embodiments, the schedule may include times when the AP 131 may initiate a downlink transmission to the group and, in some example embodiments, the radio resources that will be used for those transmissions.

Each of MTC device 1 140 and MTC device 2 140 may, in the absence of active communications, at some point enter a low-power or sleep state 710, 711 to conserve battery power, until the next scheduled transmission opportunity at which point it will awaken.

Thereafter, the AP 131 populates a context portion 296 with context information that specifies the current point of attachment and the means for communicating with the group of MTC devices 140 over the radio link 160 in the DL direction, including the schedule of transmission opportunities that the AP 131 configured into the MTC devices 140 through message flows 705, 706. The context portion 296 is then inserted, along with a local routing prefix 291 into an IP address 295 that will allow a DL packet 341 to be forwarded to the AP 131. The AP 131 constructs a response packet that includes the IP address 295 populated with the context portion 296 and routing prefix 291. The resulting response packet UL-1 340 is forwarded 715 to the MTC-IWF 120.

The MTC-IWF 120 in turn forwards 716 the response packet UL-1 340 to the RCN 110.

At some point in time thereafter, the RCN sends 720 a message in an IPv6 packet DL-2 341 to the group of MTC devices 140. The packet 341 has the destination address 280 taking on the value that was encoded into the IP address 295 included in the response packet UL-1 340 received 716 by the RCN 110. Using that address, this packet is forwarded 720 through the Internet-at-large 150 until it is received 720 by the BG 115.

BG 115 in turn forwards 721 DL packet DL-2 341 to the RAN 130. The context information populating the context portion 296 of the destination address 280 will be used to forward 721 the DL packet DL-2 341 to AP 131.

When DL packet DL-2 341 is received 721 by AP 131, AP 131 retrieves the context information encoded in the context portion 296 of the destination address 280 of the packet DL-2 341 and applies it to govern how DL messages(s) 352 should be delivered to the intended recipients, in this case, the group of MTC devices 140. Those having ordinary skill in the relevant art will appreciate that as the reception 721 of DL packet DL-2 341 at AP 131 is not synchronized with the radio link transmission schedule established by AP 131 with the group of MTC devices 140, AP 131 may be called upon to buffer the packet until the next scheduled transmission opportunity for transmitting information to each MTC device 140.

When the next scheduled transmission opportunity arrives, the MTC devices 140 awaken 725, 726 and restore power to their respective receivers. They thereupon monitor any assigned DL radio resources for a transmission from AP 131. If radio resources had not previously been identified in the schedule of transmission opportunities communicated in messages 705, 706, the AP 131 may now signal or have in the interim signalled an allocation of downlink radio resources to the group of MTC devices 140 via a DCCH (not shown).

As it has buffered messages(s) to transmit, at some point during the scheduled transmission opportunity, the AP 131 transmits the buffered message(s) 352, including message 2 352 over the assigned resources to the MTC devices 140 in the group.

Based on the information contained in message 2 352, one or more of the MTC devices 140 may transmit 735 an UL response message 3 351 (only one from MTC device 1 140 is shown, by way of non-limiting example) using, in some example embodiments, an UL CBCH message.

When message 3 351 is received 735 by AP 131, the AP 131 populates the context portion 296 of an IP address 295 with context information that specifies the current point of attachment and the means for communicating with MTC device 1 140 over the radio link 160 in the DL direction, including the schedule of transmission opportunities that the AP 131 configured into the MTC devices 140 through group-based message flows 705, 706 or as an individual RRC message such as message flow 600 shown in FIG. 6. The context portion 296 is then inserted, along with a local routing prefix 291 into the source address 270 of an UL IP packet 340 that will allow a returning DL packet 341 to be forwarded to the AP 131. The resulting UL packet UL-3 340 is forwarded 740 to the BG 115.

In some example embodiments, the context portion 296 for the source address 270 in IP packet UL-3 340 in message flow 740 may be different from the context portion 296 for the IP address 295 provided in response packet UL-1 340 in message flow 715, if a dedicated DL Traffic Channel (DTCH) is allocated to MTC device 1 140 that is different from the multicast channel established in message flows, 705, 706. In some example embodiments, the context portion 296 for the source address 270 in IP packet UL-3 340 in message flow 740 may be a schedule of paging opportunities that was configured into the MTC device 140 using an individual RRC message such as message flow 600 shown in FIG. 6.

BG 115 in turn forwards 741 packet UL-3 340 to the RCN 110.

Each of MTC device 1 140 and MTC device 2 140 may, in the absence of active communications, at some point enter a low-power or sleep state 750, 751 to conserve battery power, until the next scheduled transmission opportunity at which point it will awaken.

Example Method Actions

Figure 8:
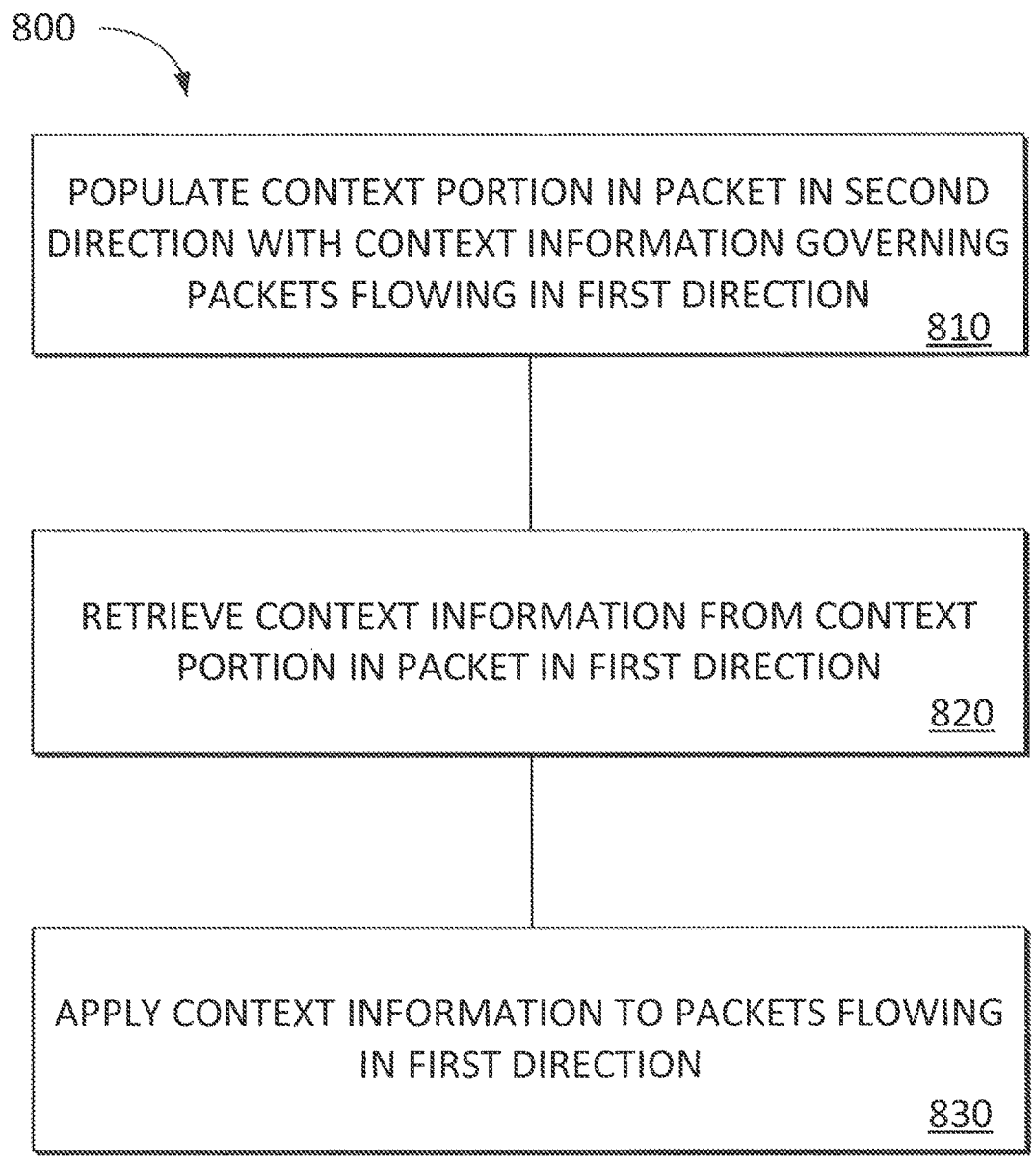
FIG. 8 is a flow chart showing method actions according to an example embodiment of the present disclosure.

Turning now to FIG. 8, there is shown a flow chart shown generally at 800, showing method actions according to an example embodiment of a method for conveying context information that governs a flow of packets in at least a first direction between at least one wireless device and a corresponding node communicating with the device according to the present disclosure. The method actions are advantageously provided as one or more computer programs 1020 (see FIG. 10).

One example action is to populate 810 the identified context portion 296 in a packet 340 going in the second direction with context information governing packets 341 flowing in the first direction.

Another example action is to retrieve 820 context information governing packets 341 flowing in the first direction from the context portion 296 in the packet 341 flowing in the first direction.

Another example action is to apply 830 the retrieved context information to govern packets 341 flowing in the first direction.

Example Device

Having described in detail example embodiments that are in accordance with the present disclosure, it is noted that the embodiments reside primarily in combinations of apparatus or devices, such as the RCN 110, BG 115, MTC-IWF 120, APs 131, 330, 331, controller 334, wireless device 350 and MTC device 140 and processing actions related to interactions between one or more of such components.

In some example embodiments, the APs 131, 330, 331, and controller 334 may comprise or form part of a base station. In some example embodiments, the MTC device 140 may comprise or form part of a wireless communications device 350. Although some embodiments may include mobile devices, not all embodiments are limited to mobile devices; rather, various embodiments may be implemented within a variety of wireless communications devices or terminals, including sensor devices, actuator devices, handheld devices, mobile telephones, laptop computers, tablets, or personal digital assistants (PDAs).

Figure 9:
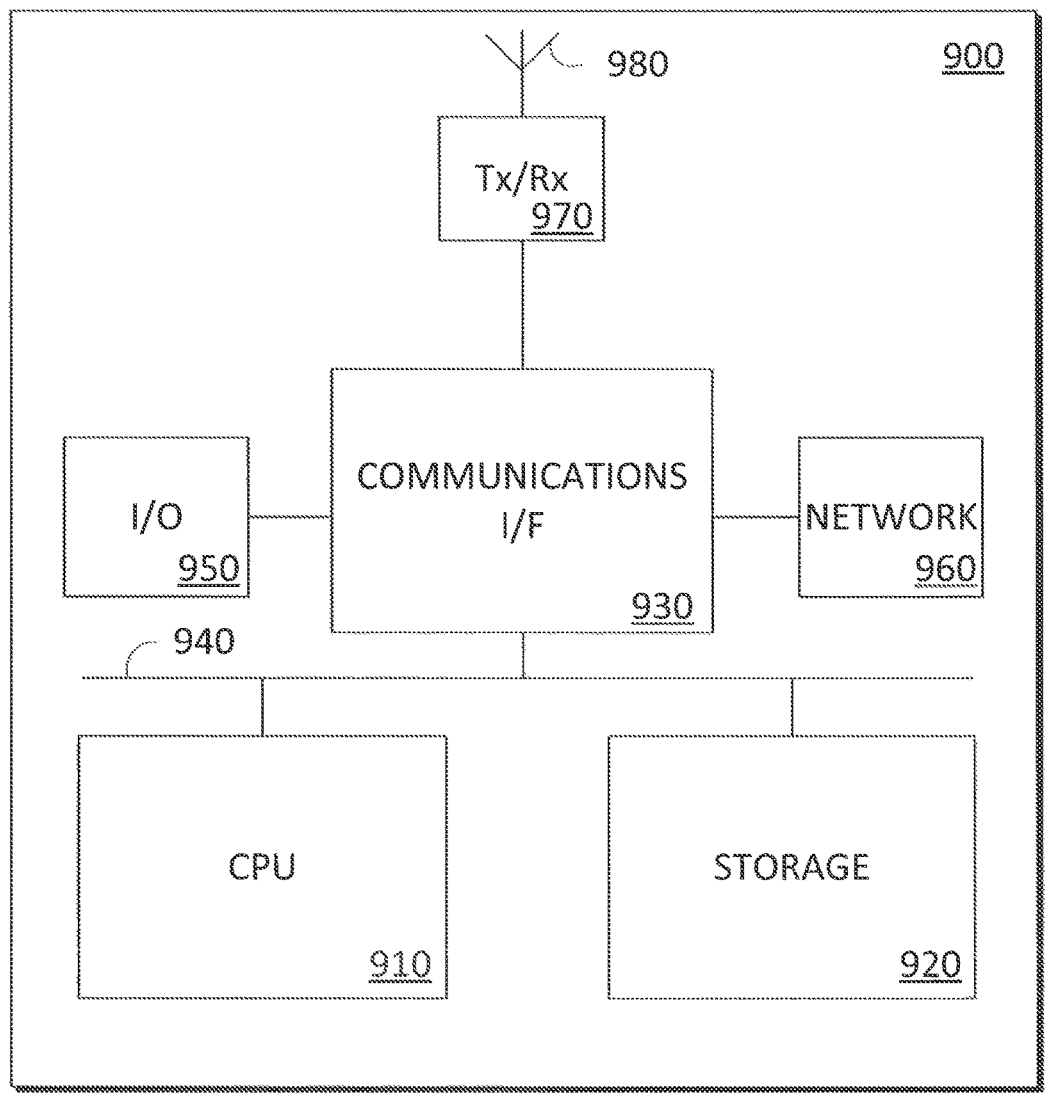
FIG. 9 is a schematic view of a processing system according to an example embodiment of the present disclosure.

FIG. 9 is a block diagram of a processing system that may be used for implementing one or more devices, shown generally at 900, such as the RCN 110, BG 115, MTC-IWF 120, APs 131, 330, 331, controller 334 and MTC device 140, wireless device 350 and for performing actions in one or more of the methods disclosed herein.

The device 900 comprises a processing unit 910, a storage medium 920 and a communications interface 930. In some example embodiments, the device 900 may also comprise a processing bus 940 interconnecting some or all of these components, as well as other devices and/or controllers. In some example embodiments, the device 900 may comprise an input/output (I/O) device 950, a network connectivity device 960, a transceiver 970 and/or an antenna 980.

Specific devices may utilize all or only a subset of the components shown therein, alone or in combination with other components not shown, and levels of integration may vary from device 900 to device 900. Furthermore, a device 900 may contain multiple instances of a component, such as multiple processing units 910, storage media 920, communications interfaces 930, processing buses 940, I/O devices 950, network connectivity devices 960, transceivers 970 and/or antennas 980 and the like.

The processing unit 910 is provided using any combination of one or more of a suitable central processing unit (CPU), both general-purpose and application-specific, multiprocessor, micro-controller, digital signal processor (DSP), application-specific integrated circuit (ASIC), field-programmable gate array (FPGA) and the like. Multiple processing units 910 may be present. Any given processing unit 910 may be dedicated, shared or general-purpose. In some example embodiments, the processing unit 910 may comprise, in whole or in part, dedicated hardware or hardware capable of executing structure.

The processing unit 910 controls the general operation of the device 900, by way of non-limiting example, by sending data and/or control signals to the communications interface 930, and by retrieving data and/or instructions from the storage medium 920 to execute method actions disclosed herein. Such instructions may be executed simultaneously, serially, in distributed fashion or otherwise, by one or multiple processing units 910.

However configured, the hardware of the processing unit 910 is configured so as to be capable of operating with sufficient software, processing power, memory resources and network throughput capability to handle any workload placed upon it.

The storage medium 920 may comprise persistent or non-persistent or volatile non-transitory storage, which, by way of non-limiting example, can be any single one or more of any combination of one or more of buffer circuits such as latches or flip flops, magnetic memory, such as a magnetic tape, magnetic cards, semiconductor memory devices, such as random access memory (RAM), which may be static (SRAM) or dynamic (DRAM), including synchronous DRAM (SDRAM), read-only memory (ROM), erasable programmable read-only memory (EPROM) or electrically erasable programmable read-only memory (EEPROM), a mass storage device comprising any single one or more of any combination of magnetic disks such as a floppy disk or hard disk, magneto-optical disk, optical memory or optical disk, such as a compact disk (CD), or a digital versatile (or video) disk (DVD) or a Blu-Ray disk, solid state memory and/or flash memory devices, whether internally or in an external memory or remotely mounted memory or network connectivity device such as a Universal Serial Bus (USB)-based memory device. In an embodiment, the memory may include ROM for use at boot-up, and DRAM for program and data storage for use while executing programs.

The storage medium 920 provides storage of data used by the device 900, including context information, whether or not incorporated in a store such as a flow descriptor database (not shown) or a radio resource context database (not shown), as described above.

The storage medium 920 may also be configured to store computer codes and/or code sequences, instructions, configuration information, data and/or scripts in a computer program 1020 (see FIG. 10) residing on or in a computer program product 1000 that, when executed by the processing unit 910, causes the processing unit 910 to perform one or more functions associated with the device 900, whether the RCN 110, BG 115, MTC-IWF 120, APs 131, 330, 331, controller 334, wireless device 350 or MTC device 140, as disclosed herein.

Figure 10:
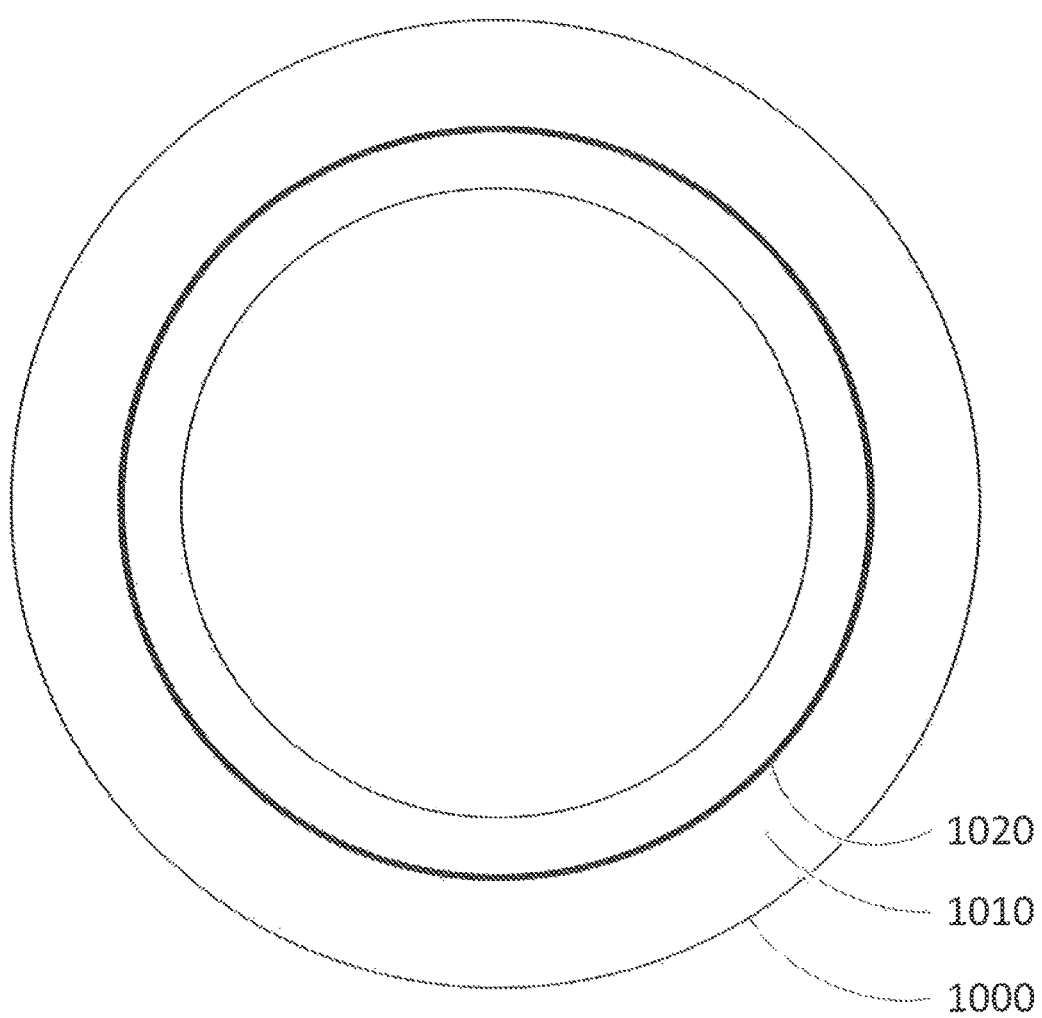
FIG. 10 is a schematic view of a computer program product according to an example embodiment of the present disclosure.

Turning now to FIG. 10, there is shown one example of a computer program product 1000 comprising computer-readable means 1010. On this computer-readable means 1010, a computer program 1020 can be stored, which computer program 1020 can cause the processing unit 910 and thereto operatively-coupled entities and components, such as the storage medium 920 and the communications interface 930 to execute methods according to example embodiments described herein. The computer program 1020 and/or computer program product 1000 may thus provide means for performing any actions as disclosed in example embodiments herein.

In the example embodiment of FIG. 10, the computer program product 1000 is illustrated as an optical disk. However, while the computer program 1020 is here schematically shown as a track on the depicted optical disk, the computer program 1020 can be stored in the storage medium 920 in any way suitable for the computer program product 1000.

Each computer program 1020 may be implemented in a high-level procedural or object-oriented or otherwise organized programming language, or in object code, assembly or machine language, if desired; and in any case the language can be a compiled or interpreted language. Further, the foregoing description of one or more specific embodiments does not limit the implementation of the present disclosure to any particular computer programming language, operating system, system architecture or device architecture.

The communications interface 930 facilitates communication with the I/O device(s) 950, network connectivity device(s) 960 and/or other entities in the communications network 100. In some example embodiments, the communications interface 930 is for connection to a transceiver 970, which may comprise one or more transmitters and/or receivers, and at least one antenna 980, through which such communications are effected. As such, the communications interface 930 may comprise one or more interfaces, including without limitation, one or more video adapters, parallel interfaces and serial interfaces including without limitation USB interfaces comprising analog and/or digital components and a suitable number of ports, to couple internal and external I/O devices 950, network connectivity devices 960 and the like to the processing unit 910.

The processing bus 940 may be one or more of any type of several bus architectures including a memory bus or memory controller, a peripheral bus, video bus, or the like.

I/O devices 950 may comprise displays coupled to respective video adapters, including without limitation, video monitors, liquid crystal displays (LCDs), light-emitting diode (LED) displays, touch screen displays, input devices including without limitation such touch screen displays, keyboards, keypads, pointing devices including without limitation mice, touch pads, trackballs, track pads, as well as sensors including iris scanners, fingerprint and/or palmprint sensors, voice recognition and transcription devices, printers including 3D printers, card readers, paper tape readers and other input and/or output devices.

Network connectivity devices 960 may comprise wired and/or wireless links, including modems, modem banks, USB interface cards, serial interfaces, Fiber Distributed Data Interface (FDDI) cards, Local Area Network (LAN) cards including without limitation Ethernet cards, token ring cards, Wireless LAN (WLAN) cards, radio transceiver cards and other network devices for communication with access nodes and/or different networks 100, 130.

Such network connectivity devices may enable the processing unit 910 to communicate with the internet 100 or one or more intranets (not shown), whether or not through by way of non-limiting example, a LAN, a Wide Area Network (WAN) or a Metropolitan Area Network (MAN), to communicate with remote devices, such as, without limitation other processing units 910, remote storage facilities (not shown) and the like, for data processing and/or communications. The network connectivity devices 960 may also comprise and/or interface with one or more transceivers 970 for wirelessly or otherwise transmitting and receiving signals. With such a network connection, it is contemplated that the processing unit 910 may receive information from the network 100 or might output information to the network 100 in the course of performing one or more of the above-described method actions.

The transceiver 970 operates to prepare data to be transmitted and/or to convert received data for processing by the processing unit 910. In some example embodiments, the transceiver 970 converts the data to and/or from a baseband format to a different wavelength and/or frequency.

In some example embodiments, instructions, and/or scripts that may comprise a computer program for execution by the processing unit 910, as well as data, may be received from and outputted to the network 100, for example, in the form of a computer data baseband signal or a signal embodied in a carrier wave. The baseband signal or signal embodied in a carrier wave generated by the network connectivity device(s) 960 may propagate in or on the surface of electrical conductors, in coaxial cables, in waveguides, in optical media, including without limitation optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods.

Other components, as well as related functionality of the device 900, may have been omitted in order not to obscure the concepts presented herein.

Figure 11:
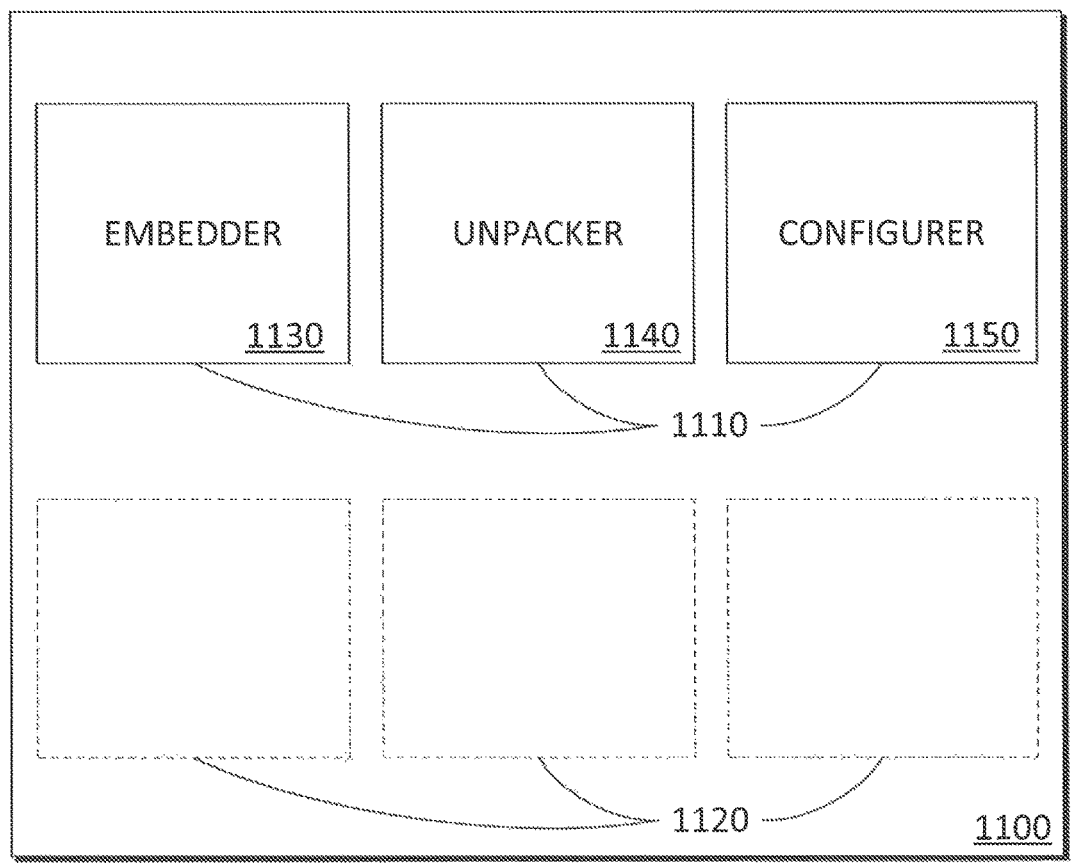
FIG. 11 is a schematic view of an access point according to an example embodiment of the present disclosure, showing example components thereof.

Turning now to FIG. 11, there is shown a schematic view, in terms of some of its functional aspects, the components of a device, shown generally at 1100, which in some example embodiments may be an AP 131, 330, 331, an access router (not shown), controller 334, an MTC-IWF 115 and/or a wireless device 350 (by way of non-limiting example, the device may be provided with an IP address 295 containing context or instructions from an AP 131, 330, 331 on what context to use) that may populate the context portion 296 with context information, retrieve from the context portion 296 and/or apply such context information as disclosed herein. The device 1100 comprises a number of functional units, referred to generically as 1110, according to an example embodiment. The device 1100 may further comprise a number of other functional units, referred to generally as 1120. Each functional unit 1110 will be identified below and its functionality further discussed below as well as the context in which the functional units 1110 may be used.

In general terms, each functional unit 1110, 1120 may be implemented in digital electronic circuitry, computer hardware, software or firmware. Apparatus of the disclosure can be implemented in the computer program product 1000 tangibly embodied in the storage medium 930 for execution by the processing unit 910; and method actions can be performed by the processing unit 910 executing a computer program 1020 of instructions to perform functions of the disclosure by operating on input data and generating output. The processing unit 910 may thus be arranged to fetch instructions from the storage medium 920 as provided by a functional unit 1110, 1120 and to execute these instructions, thereby performing any method actions as described herein.

Those having ordinary skill in the relevant art will appreciate that other instructions and operations to implement the described techniques and methods may also be stored on the storage medium 920. Software running from the storage medium 920 may interface with circuitry to perform the described techniques and method actions.

Moreover, explicit use of the term "module", "processor" or "controller" should not be construed to refer exclusively to a particular configuration of hardware.

In some example embodiments, the device 1100 may comprise an embedder 1130, an unpacker 1140 and/or a configurer 1150.

The embedder 1130 populates the context portion 296 of the source address 270 of the packet header 200 of an UL packet 340 with context information before transmission along the network 100. The context information is associated with information that governs the flow of packets in the DL direction 341.

The unpacker 1140 retrieves context information from the context portion 296 of the destination address 280 of the packet header 200 of a DL packet 341 upon receipt from along the network 100. The context information is associated with information that governs the flow of packets in the DL direction, including the DL packet 341.

The configurer 1150 applies the retrieved context information to govern the context applicable to packets including the DL packet 341 in the DL packet flow.

Figure 12:
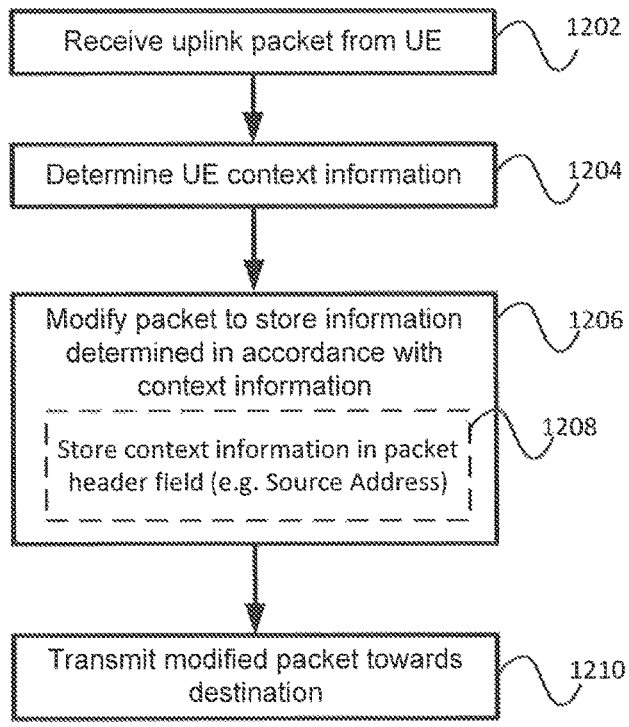
FIG. 12 is a flowchart illustrating an exemplary method according to an embodiment of the present invention.

FIG. 12 illustrates an exemplary method according to an embodiment of the present invention. As shown, in step 1202 an uplink packet is received from the UE. The packet could be received by an access point, such as an eNodeB, or by a node further upstream than the radio edge. The context information associated with the UE is determined in step 1204. Not all the context information associated with the UE needs to be determined in this step, if only partial information is to be stored in the packet, then only that information needs to be determined. In step 1206, the packet is modified in accordance with the context information so that context information is stored in the packet. As shown in optional step 1208, the context information can be stored in the source address, which is the IP address associated with the UE. The packet is then transmitted towards the destination in step 1210.

Those skilled in the art will appreciate that after storing context information in the packet, the context information can be released. This allows a node, such as an eNodeB, to free up needed resources.

Figure 13:
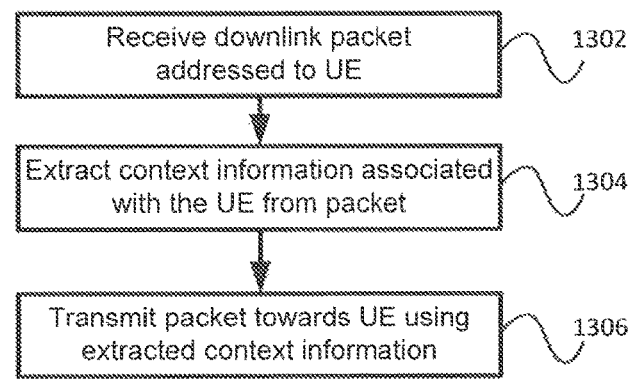
FIG. 13 is a flowchart illustrating an exemplary method according to an embodiment of the present invention.

FIG. 13 illustrates an exemplary method according to an embodiment of the present invention. As shown in step 1302, a downlink packet addressed to a UE is received in step 1302. The packet contains context information associated with the UE, and this context associated with the UE is extracted in step 1304, and is used in step 1306 to transmit the packet towards the UE.

One skilled in the art will appreciate that the context information stored in step 1206 is retrieved in step 1304. By storing the information in the packet in a manner that ensures that the stored information is sent back, local storage of the context information can be reduced. One mechanism is to store context information in the address associated with the UE. If there are a limited number of possible sets of context information, the information stored in the packet can be an index that is used to retrieve the context information from a (pre-defined) table when it is extracted in step 1304.

As discussed, the disclosure above provides a method for conveying context information that governs packets flowing in at least a first direction between at least one wireless device and a corresponding node communicating with the device, comprising actions of populating a context portion, of a header of a packet for flow in a second reverse direction, that, once populated with context information that governs packet flow in the first direction, is imparted in the packet flow along the network in either the first or second direction and is conveyed in both directions; retrieving the context information from the context portion of a packet flowing in the first direction; and applying the retrieved information to govern packet flow in the first direction therefrom.

The context portion can be embedded in a network address in the packet header. Populating a context portion may include putting the context portion in a source address in the packet header, which may be into a predefined context portion format. Alternatively, the action of retrieving comprises retrieving context information from the context portion in a destination address in the packet header. The packets may be IPv6 packets, and may replace an interface identifier in an IPv6 address, where optionally populating comprises populating a routing prefix in an IPv6 address. In some embodiments, the context information comprises at least one aspect selected from a group consisting of at least one network entity, a radio transmission group, an access point, an access point controller, the device, a radio access link connection comprising at least one of a time, frequency, spatial and coding resource, a radio link transmission parameter comprising at least one of a modulation scheme, a coding scheme, a transmit power level and a precoding matrix, a radio link transmission opportunity comprising a transmission resource and a schedule, a paging group, a paging opportunity comprising a paging resource and a schedule, a path, a QoS parameter comprising at least one of allowable delay, allowable packet loss and a battery consumption parameter, a network node identity, a communications protocol, a service function chain, a logical context identifier other than an inherent characteristic of the device that denotes context, and any combination of any of these. The context information can be a numerical value, and it may take the form of a pointer identifying an entry in a table of numerical values. In another embodiment, the action of populating comprises deriving the context information from information selected from a group consisting of an IP header field, a transport protocol header field, an application header field, a characteristic of a radio access link connection over which packets flow in the first direction, a characteristic of a radio access link connection over which packets flow in the second direction, a network node identity, a communications protocol, an indication that the device is a mobile device, an indication that the device is a non-mobile device, an indication that the device is an MTC device, an indication that the device is an HTC device, a MAC control element of a radio access link connection, an instruction received from an entity selected from a group consisting of a radio resource management entity, a traffic management entity, an interworking function, a border gateway, an application, an access point, an access point controller and any combination of any of these. In an embodiment, the first direction is a downlink direction towards the device, and optionally, the second direction is an uplink direction from the device. The action of populating may comprise populating the context portion in the header of a plurality of packet flows in the second direction with common context information. In another embodiment, the at least one wireless device comprises a group of devices associated with packets flowing in the first direction that are governed by common context information. The wireless device may be an MTC device or a mobil device, while the corresponding node can be an application server or an M2M application in communication with the at least one wireless device. The corresponding node may copy the context portion from a packet flowing in the second direction to the context portion of a packet flowing in the first direction. In another embodiment, the context information remains unchanged during packet flow along the network in at least one of the first and second directions.

As discussed, the disclosure above teaches an embedder node through which packets flow in a second direction for use in a a network through which packets flow in a first and a second reverse direction between at least one wireless device and a corresponding node communicating with the device. The node comprises an embedder for populating a context portion, of a header of a packet for transmission in the second direction, that, once populated with context information that governs packet flow in the first direction, is imparted in the packet flow along the network in either the first or second direction and is conveyed in both directions.

The embedder can be selected from a group consisting of an access point, a base station, a base station controller, a radio network controller, a NodeB, an evolved NodeB, a radio access controller, an access router, an access point controller, an inter-working function, a device, and any combination of any of these. The packet can be received in the second direction by the corresponding node and the context portion of the packet is copied by the corresponding node into the context portion of a packet transmitted in the first direction, and optionally the node includes an unpacker for retrieving, from the context portion of the packet transmitted in the first direction, context information that governs packet flow in the first direction. The embedder can also include a configurer for applying context information retrieved from the context portion of the packet transmitted in the first direction to packet flow in the first direction.

As discussed, the disclosure above also teaches an unpacker node through which packets flow in a first direction, for use in a network through which packets flow in the first and a second reverse direction between at least one wireless device and a corresponding node communicating with the device. The node comprises an unpacker that can retrieve, from a context portion of a header of a packet received in the first direction, that, once populated with context information that governs packet flow in the first direction, is imparted in the packet flow along the network in either the first or second direction and is conveyed in both directions. The node can further include a configurer for applying the retrieved context information to packet flow in the first direction. The node can further include an embedder for populating a context portion, of a header of a packet for transmission in the second direction, with context information governing packet flow in the first direction. The unpacker node can be selected from a group consisting of an access point, a base station, a base station controller, a radio network controller, a NodeB, an evolved NodeB, a radio access controller, an access router, an access point controller, an inter-working function and any combination of any of these.

Terminology

Certain terms are used throughout to refer to particular components. Manufacturers may refer to a component by different names. Use of a particular term or name is not intended to distinguish between components that differ in name but not in function.

A non-exclusive list of certain acronyms and abbreviations used herein, which may or may not be familiar to persons having ordinary skill in the relevant art, is provided below:

3GPP Third Generation Partnership Project (3gpp.org)
802.11 IEEE Wireless Local Area Network standard (ieee802.org/11)
AP Access Point
AS Application Server
ASIC Application-Specific Integrated Circuit
BG Border Gateway
BS Base Station
CBCH Contention-Based Channel
CD Compact Disk
CoAP Constrained Application Protocol
CPU Central Processing Unit
DCCH Downlink Control Channel
DHCP Dynamic Host Configuration Protocol
DL Downlink (i.e. to a Wireless Device)
DRAM Dynamic Random Access Memory
DSP Digital Signal Processor
DTCH Downlink Traffic Channel
DVD Digital Versatile (or Video) Disk
EEPROM Electrically Erasable Programmable Read-Only Memory
eNB evolved Node-B
EPROM Erasable Programmable Read-Only Memory
E-UTRAN Evolved Universal Terrestrial Radio Access Network
FDDI Fiber Distributed Data Interface
FPGA Field-Programmable Gate Array
FS Fixed Station
GPRS General Packet Radio Service
GTP GPRS Tunnelling Protocol
HetNet Heterogeneous Network
HLR Home Location Register
HSS Home Subscriber Server
HTC Human-Type Communications
HTTP Hyper-Text Transfer Protocol
IEEE Institute of Electrical and Electronics Engineers (ieee.org)
IETF Internet Engineering Task Force (ietf.org)
I/O Input/Output
IP Internet Protocol
IPv6 IP version 6
IWF Inter-Working Function
LAN Local Area Network
LCD Liquid Crystal Display
LED Light-Emitting Diode
M2M Machine-to-Machine
MA Mobility Anchor
MAN Metropolitan Area Network
MAC Medium Access Control
MME Mobility Management Entity
MIP Mobile IP
MS Mobile Station
MTC Machine-Type Communications
NAT Network Address Translator
QoS Quality of Service
RAB Radio Access Bearer
RACH Random Access Channel
RAM Random Access Memory
RAN Radio Access Network
RAT Radio Access Technology
RCN Remote Corresponding Node
RFC Request For Comments
ROM Read-Only Memory RRC Radio Resource Control
RRM Radio Resource Management
SDRAM Synchronous Dynamic Random Access Memory
SFC Service Function Chain
SLAAC StateLess Address Auto Configuration
SRAM Static Random Access Memory
TCP Transmission Control Protocol
TM Traffic Management
UDP User Datagram Protocol
UE User Equipment
UL Uplink (i.e. From a Wireless Device)
URI Uniform Resource Identifier
USB Universal Serial Bus
VLR Visitor Location Register
VNF Virtualized Network Function
WAN Wide Area Network
WD Wireless Device
WLAN Wireless Local Area Network (cf. IEEE 802.11)

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether electrically, mechanically, chemically, or otherwise.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of the device, area or volume or designated parts thereof. Moreover, all dimensions described herein are intended solely to be by way of example for purposes of illustrating certain embodiments and are not intended to limit the scope of the disclosure to any embodiments that may depart from such dimensions as may be specified.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

General

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated that block diagrams reproduced herein can represent conceptual views of illustrative components embodying the principles of the technology.

The purpose of the Abstract is to enable the relevant patent office or the public generally, and specifically, persons of ordinary skill in the art who are not familiar with patent or legal terms or phraseology, to quickly determine from a cursory inspection, the nature of the technical disclosure. The Abstract is neither intended to define the scope of this disclosure, which is measured by its claims, nor is it intended to be limiting as to the scope of this disclosure in any way.

The structure, manufacture and use of the presently disclosed embodiments have been discussed above. While example embodiments are disclosed, this is not intended to be limiting the scope of the presently described embodiments. It should be appreciated, however that the present disclosure, which is described by the claims and not by the implementation details provided, which can be modified by omitting, adding or replacing elements with equivalent functional elements, provides many applicable inventive concepts that may be embodied in a wide variety of specific contexts. The specific embodiments discussed are merely illustrative of specific ways to make and use the disclosure, and do not limit the scope of the present disclosure. Rather, the general principles set forth herein are considered to be merely illustrative of the scope of the present disclosure.

In particular, features from one or more of the above-described embodiments may be selected to create alternative embodiments comprised of a sub-combination of features that may not be explicitly described above. In addition, features from one or more of the above-described embodiments may be selected and combined to create alternative embodiments comprised of a combination of features that may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

Further, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other examples of changes, substitutions, and alterations are easily ascertainable and could be made without departing from the scope disclosed herein.

It will be apparent that various modifications and variations covering alternatives, modifications and equivalents will be apparent to persons having ordinary skill in the relevant art upon reference to this description and may be made to the embodiments disclosed herein, without departing from the present disclosure, as defined by the appended claims.

Other embodiments consistent with the present disclosure will be apparent from consideration of the specification and the practice of the disclosure disclosed therein. Accordingly the specification and the embodiments disclosed therein are to be considered examples only, with a true scope of the disclosure being disclosed by the following numbered claims.

What is claimed is:

1. A method of forwarding uplink user plane packets from a user equipment (UE), the method comprising, at a network node:

receiving an uplink user plane packet from the UE;
determining an access network (AN) context information associated with the UE, the AN context information governing downlink transmissions between the AN and the UE, the AN context information including one or more downlink transmission parameters and at least one of a downlink transmission schedule, and a downlink Quality of Service (QoS) requirement;
modifying the uplink user plane packet by inserting information associated with the AN context information into at least a portion of a source address field associated with the uplink user plane packet, the information associated with the AN context information comprising one of the RAN context information associated with the UE and an index value corresponding to the AN context information associated with the UE; and
transmitting the modified uplink user plane packet towards a destination.

2. The method of claim 1 wherein receiving an uplink user plane packet includes receiving the uplink user plane packet over a wired interface from the UE.

3. The method of claim 1 wherein receiving an uplink user plane packet includes receiving the uplink user plane packet over a wireless interface from the UE.

4. The method of claim 1 wherein the source address field comprises an Internet Protocol version 6 (IPv6) address, and modifying comprises inserting information associated with the AN context into at least a portion of the IPv6 address.

5. The method of claim 4 wherein the information associated with the AN context comprises the index corresponding to the AN context information.

6. The method of claim 1, wherein the AN context information associated with the UE comprises at least one of an identifier of a network entity, a radio transmission group, an access point, an access point controller, a device type, a radio access link connection comprising at least one of a time, frequency, spatial and coding resource, a radio link transmission parameter comprising at least one of a modulation scheme, a coding scheme, a transmit power level and a precoding matrix, a radio link transmission opportunity comprising at least one of a paging resource and a schedule, a network forwarding path, a quality of service (QoS) parameter comprising at least one of allowable delay, allowable packet loss and a battery consumption parameter, a network node identity, a communications protocol, a service function chain (SFC), an indication that the device is a mobile device, an indication that the device is a non-mobile device, an indication that the device is a machine-type communication (MTC) device, an indication that the device is a human-type communication (HTC) device and a logical context identifier other than an inherent characteristic of the device that denotes context.

7. A network node for forwarding uplink user plane packets from a user equipment (UE), comprising:
a UE interface for receiving user plane packets from the UE;
a network interface for transmitting user plane packets to destination addresses;
a memory for storing instructions; and
a processor, operatively connected to the UE interface, the network interface and the memory, that upon execution of instructions stored in the memory causes the node to:
receive an uplink user plane packet from the UE;
determine an access network (AN) context associated with the UE that governs downlink transmissions between the AN and UE, the AN context information including one or more downlink transmission parameters and at least one of a downlink transmission schedule, a downlink Quality of Service, and a QoS, requirement;
modify the uplink user plane packet by inserting information associated with the AN context information into at least a portion of a source address field associated with the uplink user plane packet; and
transmit the modified uplink user plane packet over the network interface towards a destination.

8. The node of claim 7 wherein the network node is a network access point.

9. The node of claim 7 wherein the network node is an Evolved NodeB (eNodeB).

10. The node of claim 7 wherein the UE interface is an air interface for receiving user plane packets from the UE over a wireless link.

11. The network node of claim 7, wherein the AN context information is derived from at least one of an IP header field, a transport protocol header field, an application header field, a characteristic of a radio access link connection over which packets flow in the downlink direction, a characteristic of a radio access link connection over which packets flow in the uplink direction, a network node identity, a characteristic of a communications protocol, a medium access control (MAC) control element of a radio access link connection, and an instruction received from at least one of a radio resource management (RRM) entity, a traffic management (TM) entity, a interworking function (IWF), a border gateway (BG), an application, an access point (AP) and an AP controller.

12. A method of forwarding downlink user plane packets addressed to a user equipment (UE), the method comprising:
receiving a downlink user plane packet destined for the UE;
extracting information associated with an access network (AN) context information associated with the UE from at least a portion of a destination address field associated with the downlink user plane packet, the AN context information governing downlink communications between the AN and the UE;
determining downlink transmission parameters and at least one of a downlink transmission schedule and a downlink Quality of Service (QoS) requirement associated with the AN context information; and
transmitting the downlink user plane packet towards the UE, the transmission being performed in accordance with the downlink transmission parameters and the at least one of the downlink transmission schedule and the downlink QoS requirement.

13. The method of claim 12 wherein the information associated with the AN context is an index value corresponding to the AN context information associated with the UE, and determining comprises determining the AN context in accordance with the extracted index.

14. The method of claim 12, wherein the destination address field comprises an Internet Protocol version 6 (IPv6) address, and extracting comprises extracting information associated with the AN context information from at least a portion of the IPv6 address.

15. The method of claim 12, further comprising:
determining uplink transmission parameters associated with the AN context information;
transmitting the uplink transmission parameters to the UE; and receiving an uplink user plane packet from the UE, the reception being performed in accordance with the uplink transmission parameters.

16. A network node for forwarding downlink user plane packets addressed to a User Equipment (UE), comprising:
- a UE interface for transmitting user plane packets towards the UE;
- a network interface for receiving user plane packets addressed to the UE;
- a memory for storing instructions; and
- a processor, operatively connected to the UE interface, the network interface and the memory, that upon execution of the instruction stored in the memory causes the node to:
  - receive over the network interface, a downlink user plane packet destined for the UE;
  - extract information associated with an access network (AN) context information associated with the UE from at least a portion of a destination address field associated with the downlink user plane packet, the AN context information governing downlink communications between the AN and the UE;
  - determine downlink transmission parameters and at least one of a downlink transmission schedule and a downlink Quality of Service (QoS) requirement associated with the AN context information; and
  - transmit the downlink user plane packet over the UE interface toward the UE, the transmission being performed in accordance with the downlink transmission parameters and the at least one of the downlink transmission schedule and the downlink QoS requirement.

17. The network node of claim 16 wherein the network node is a network access point.

18. The network node of claim 16 wherein the network node is an Evolved NodeB (eNodeB).

19. The network node of claim 16 wherein the UE interface is an air interface for transmitting user plane packets to the UE over a wireless link.

20. The network node of claim 16, wherein the AN context information comprises at least one of an identifier of a network entity, a radio transmission group, an access point, an access point controller, a device type, a radio access link connection comprising at least one of a time, frequency, spatial and coding resource, a radio link transmission parameter comprising at least one of a modulation scheme, a coding scheme, a transmit power level and a precoding matrix, a radio link transmission opportunity comprising at least one of a paging resource and a schedule, a network forwarding path, a quality of service (QoS) parameter comprising at least one of allowable delay, allowable packet loss and a battery consumption parameter, a network node identity, a communications protocol, a service function chain (SFC), an indication that the device is a mobile device, an indication that the device is a non-mobile device, an indication that the device is a machine-type communication (MTC) device, an indication that the device is a human-type communication (HTC) device and a logical context identifier other than an inherent characteristic of the device that denotes context.

21. The network node of claim 16, wherein the index comprises a numerical value.

22. The network node of claim 16, wherein index comprises a pointer into a table of numerical values.

* * * * *